(12) United States Patent
Tung

(10) Patent No.: US 10,593,106 B2
(45) Date of Patent: Mar. 17, 2020

(54) THREE-DIMENSIONAL MODEL GENERATING SYSTEM, THREE-DIMENSIONAL MODEL GENERATING METHOD, AND PROGRAM

(71) Applicant: Rakuten, Inc., Tokyo (JP)

(72) Inventor: Tony Tung, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 33 days.

(21) Appl. No.: 16/066,674

(22) PCT Filed: Feb. 16, 2016

(86) PCT No.: PCT/JP2016/054404
§ 371 (c)(1),
(2) Date: Jun. 28, 2018

(87) PCT Pub. No.: WO2017/141344
PCT Pub. Date: Aug. 24, 2017

(65) Prior Publication Data
US 2019/0156564 A1 May 23, 2019

(51) Int. Cl.
*G06T 17/00* (2006.01)
*G06T 13/40* (2011.01)
*G06T 7/00* (2017.01)
*G06T 7/50* (2017.01)

(52) U.S. Cl.
CPC ............... *G06T 17/00* (2013.01); *G06T 7/00* (2013.01); *G06T 7/50* (2017.01); *G06T 13/40* (2013.01); *G06T 2207/20044* (2013.01)

(58) Field of Classification Search
None
See application file for complete search history.

(56) References Cited

U.S. PATENT DOCUMENTS

2014/0035901 A1* 2/2014 Chen ...................... G06T 13/40
345/419
2015/0213646 A1 7/2015 Ma et al.

OTHER PUBLICATIONS

Weiss, A., Hirshberg, D., Black, M., Home 3D body scans from noisy image and range data, Nov. 2011, 2011 International Conference on Computer Vision, pp. 1-8. (Year: 2011).*

(Continued)

*Primary Examiner* — Said Broome
(74) *Attorney, Agent, or Firm* — HEA Law PLLC

(57) ABSTRACT

A skeleton obtaining unit of a three-dimensional model generating system obtains a skeleton parameter, based on the depth information of an object detected by a depth detecting device. A posture changing unit changes the posture of a three-dimensional model that is able to be deformed based on a body shape parameter, based on the skeleton parameter. A surface shape obtaining unit obtains the surface shape of the object, based on the depth information. A body shape determining unit determines the body shape parameter, based on the difference between the surface shape of the three-dimensional model having the posture changed by the posture changing unit and the surface shape of the object. A body shape deforming unit deforms the three-dimensional model, based on the body shape parameter determined by the body shape parameter determining unit.

17 Claims, 18 Drawing Sheets

(56) References Cited

OTHER PUBLICATIONS

Qiaosong Wang et al: "Im2fit:Fast 3D Model Fitting and Anthropometrics using Single Consumer Depth Camera and Synthetic Data", Nov. 19, 2014, pp. 1-10, XP055577700.
A. Weiss, D. Hirshberg, and M. J.B lack. Home 3d body scans from noisy image and range data. ICCV, 2011.
Q. Wang, V. Jagadeesh, B. Ressler, and R. Piramuthu. Im2fit: Fast 3d model fitting and anthropometrics using single consumer depth camera and synthetic data. arXiv, 2014.

* cited by examiner

FIG.13
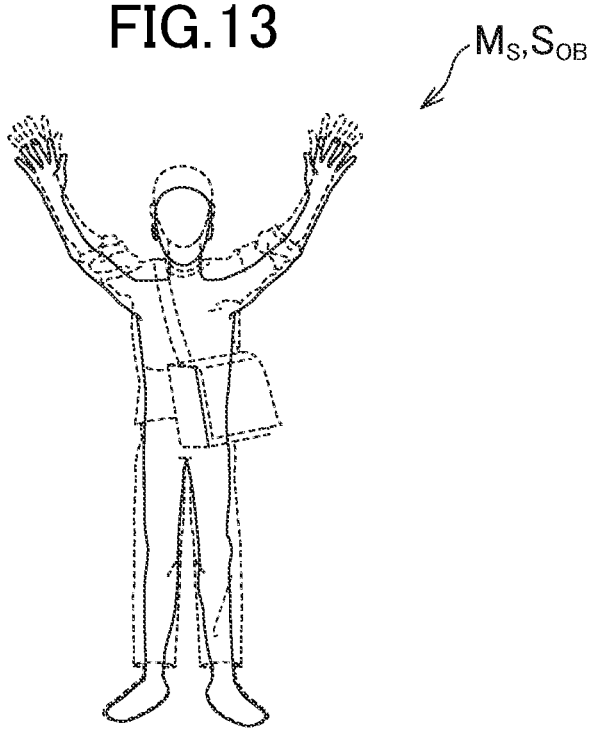
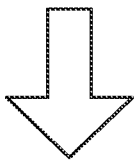
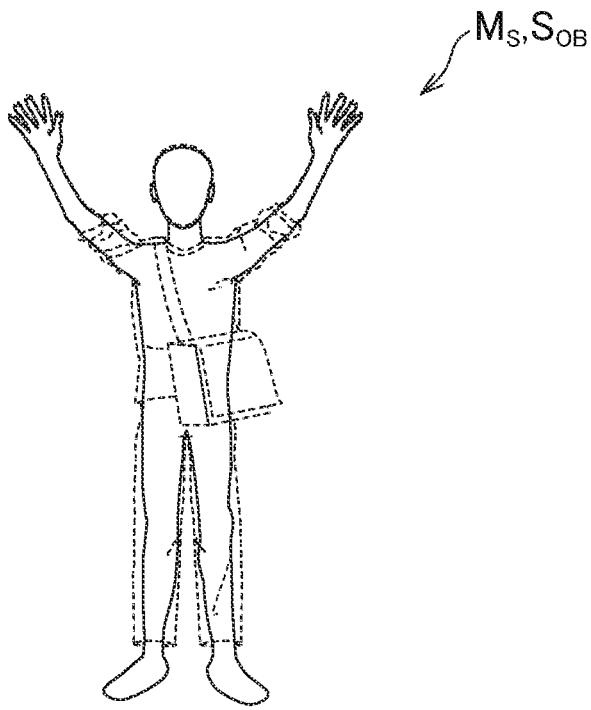

THREE-DIMENSIONAL MODEL GENERATING SYSTEM, THREE-DIMENSIONAL MODEL GENERATING METHOD, AND PROGRAM

CROSS REFERENCE TO RELATED APPLICATIONS

This application is a National Stage of International Application No. PCT/JP2016/054404 filed on Feb. 16, 2016. The contents of the above document is incorporated herein by reference in its entirety.

TECHNICAL FIELD

The present invention relates to a three-dimensional model generating system, a three-dimensional model generating method, and a program.

BACKGROUND ART

A technique for measuring an image capturing object, such as people or animals, with a depth detecting device to generate a three-dimensional (3D) model is conventionally known. For example, Non-Patent Literature 1 describes a technique for generating a 3D model by photographing an image capturing object from different directions with a plurality of RGBD cameras and inferring the body line of the image capturing object on the basis of the contour information and depth information of the image capturing object obtained with these RGBD cameras. For example, Non-Patent Literature 2 describes a technique for deforming a 3D model so as to match with the arms and legs having the lengths indicated by the depth information obtained by a single RGBD camera.

CITATION LIST

Non-Patent Literature

Non-Patent Literature 1: A. Weiss, D. Hirshberg, and M. J. Black. Home 3d body scans from noisy image and range data. ICCV, 2011.
Non-Patent Literature 2: Q. Wang, V. Jagadeesh, B. Ressler, and R. Piramuthu. Im2fit: Fast 3d model fitting and anthropometrics using single consumer depth camera and synthetic data. arXiv, 2014.

SUMMARY OF INVENTION

Technical Problem

However, the technique described in Non-Patent Literature 1 requires many RGBD cameras and thus a dedicated photo studio or other facilities. Further, need of analysis of the RGBD images obtained by photographing an image capturing object from different directions may complicate the processing, taking time to generate a 3D model. Furthermore, according the technique disclosed in Non-Patent Literature 2, as a 3D model is deformed simply based on the lengths of arms and legs, the dimension of the image capturing object cannot be precisely estimated, which generates, for example, a larger 3D model than the real image capturing object. That is, a highly precise 3D model cannot be generated.

The present invention has been conceived in view of the above, and it is an object of the present invention to quickly generate a highly precise 3D model.

Solution to Problem

In order to achieve the above objects, a three-dimensional model generating system according to the present invention includes skeleton obtaining means for obtaining a skeleton parameter, based on depth information of an object, wherein the depth information is detected by a depth detecting device; posture changing means for changing a posture of a three-dimensional model that is able to be deformed based on a body shape parameter, based on the skeleton parameter; surface shape obtaining means for obtaining a surface shape of the object, based on the depth information; body shape determining means for determining the body shape parameter, based on a difference between a surface shape of the three-dimensional model having the posture changed by the posture changing means and the surface shape of the object; and body shape deforming means for deforming the three-dimensional model, based on the body shape parameter determined by the body shape parameter determining means.

A three-dimensional model generating method according to the present invention includes a skeleton obtaining step of obtaining a skeleton parameter, based on depth information of an object detected by a depth detecting device; a posture changing step of changing a posture of a three-dimensional model that is able to be deformed based on a body shape parameter, based on the skeleton parameter; a surface shape obtaining step of obtaining a surface shape of the object, based on the depth information; a body shape determining step of determining the body shape parameter, based on a difference between a surface shape of the three-dimensional model having the posture changed at the posture changing step and the surface shape of the object; and a body shape deforming step of deforming the three-dimensional model, based on the body shape parameter determined at the body shape parameter determining step.

A program according to the present invention causes a computer to function as: skeleton obtaining means for obtaining a skeleton parameter, based on depth information of an object detected by a depth detecting device; posture changing means for changing a posture of a three-dimensional model that is able to be deformed based on a body shape parameter, based on the skeleton parameter; surface shape obtaining means for obtaining a surface shape of the object, based on the depth information; body shape determining means for determining the body shape parameter, based on a difference between a surface shape of the three-dimensional model having the posture changed by the posture changing means and the surface shape of the object; and body shape deforming means for deforming the three-dimensional model, based on the body shape parameter determined by the body shape parameter determining means.

A computer readable information storage medium according to the present invention stores the above-described program.

According to one aspect of the present invention, the three-dimensional model generating system may further include skeleton determining means for determining the skeleton parameter, based on a difference between the surface shape of the three-dimensional model and the surface shape of the object, wherein the posture changing means updates the posture of the three-dimensional model, based on the skeleton parameter determined by the skeleton determining means.

According to one aspect of the present invention, the three-dimensional model generating system may further include partial deforming means for deforming a part of the surface shape of the three-dimensional model deformed by the body shape deforming means, based on a difference in surface shape between the part and a corresponding part of the object.

According to one aspect of the present invention, the three-dimensional model generating system may further include detection range specifying means for specifying a part corresponding to a detection range of the depth detecting device from among the three-dimension model, based on the depth information, wherein the partial deforming means deforms the part specified by the detection range specifying means at the three-dimension model.

According to one aspect of the present invention, the partial deforming means deforms each part of the three-dimensional model, based on a deforming extent of an environment of the part.

According to one aspect of the present invention, the partial deforming means deforms each part of the three-dimensional model, based on a previous shape of the part.

According to one aspect of the present invention, the three-dimensional model generating system may further include body portion identifying means for identifying a body portion corresponding to a body of the object from among the three-dimensional model, based on the surface shape of the three-dimensional model or the object, wherein the body shape determining means makes larger a weight for a difference relevant to the body portion than a weight for a difference relevant to other portions when determining the body shape parameter.

According to one aspect of the present invention, the three-dimensional model generating system may further include detection range specifying means for specifying a vertex corresponding to a detection range of the depth detecting device from among the three-dimensional model, based on the depth information, wherein the body shape determining means determines the body shape parameter, based on a difference between the surface shape of the three-dimensional model in the detection range and the surface shape of the object in the detection range.

According to one aspect of the present invention, the three-dimensional model generating system may further include history recording means for recording a history of the body shape parameter in storage means, wherein the body shape determining means determines the body shape parameter, based on the history recorded by the history recording means.

Advantageous Effects of Invention

According to the present invention, it is possible to quickly generate a highly precise 3D model.

BRIEF DESCRIPTION OF DRAWINGS

FIG. 13 indicates a 3D model being changed through optimization.

DESCRIPTION OF EMBODIMENTS

1. Hardware Structure of 3D Model Generating System

Figure 1:
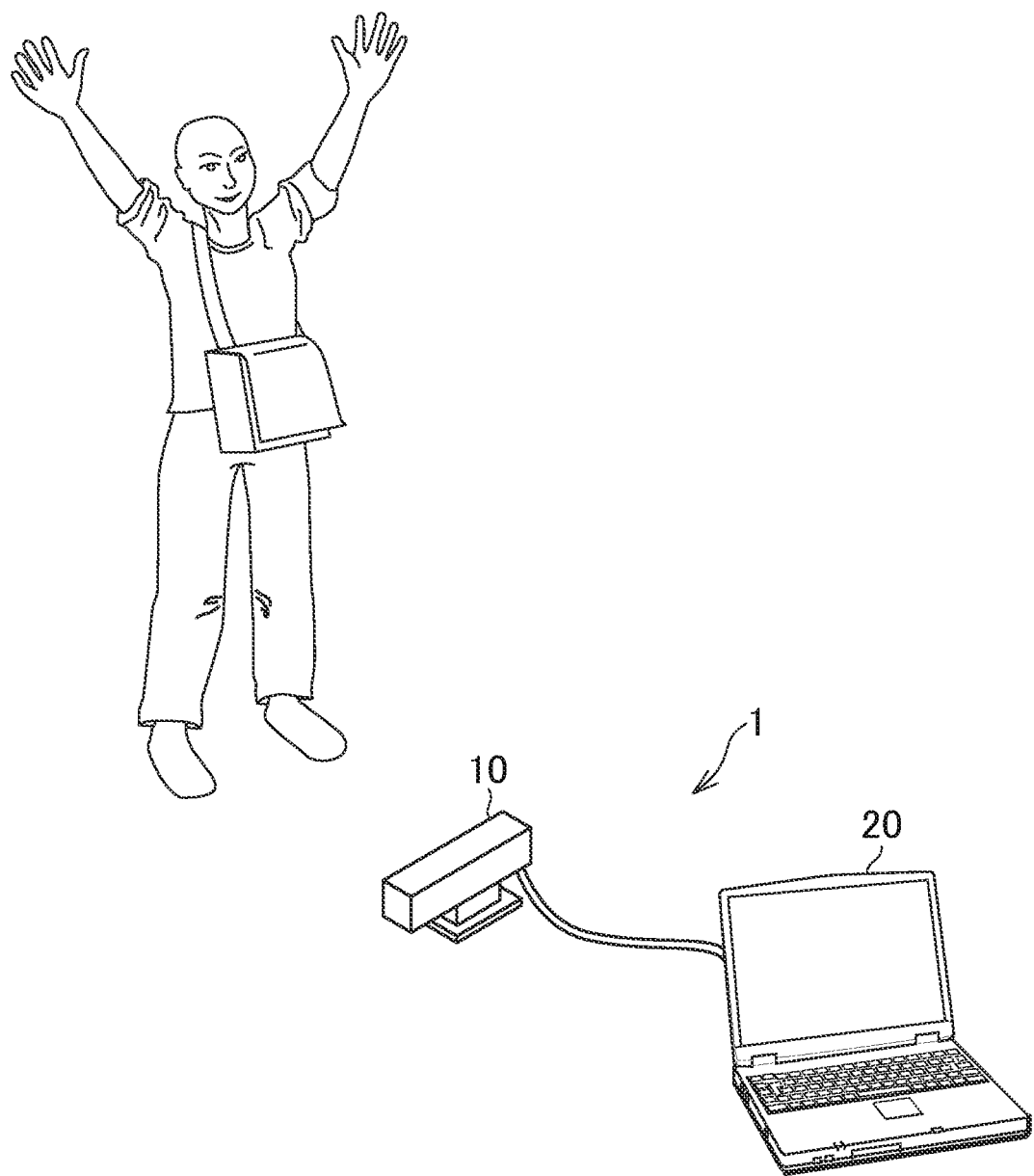
FIG. 1 illustrates a situation in which an object is photographed in a 3D model generating system.
Figure 2:
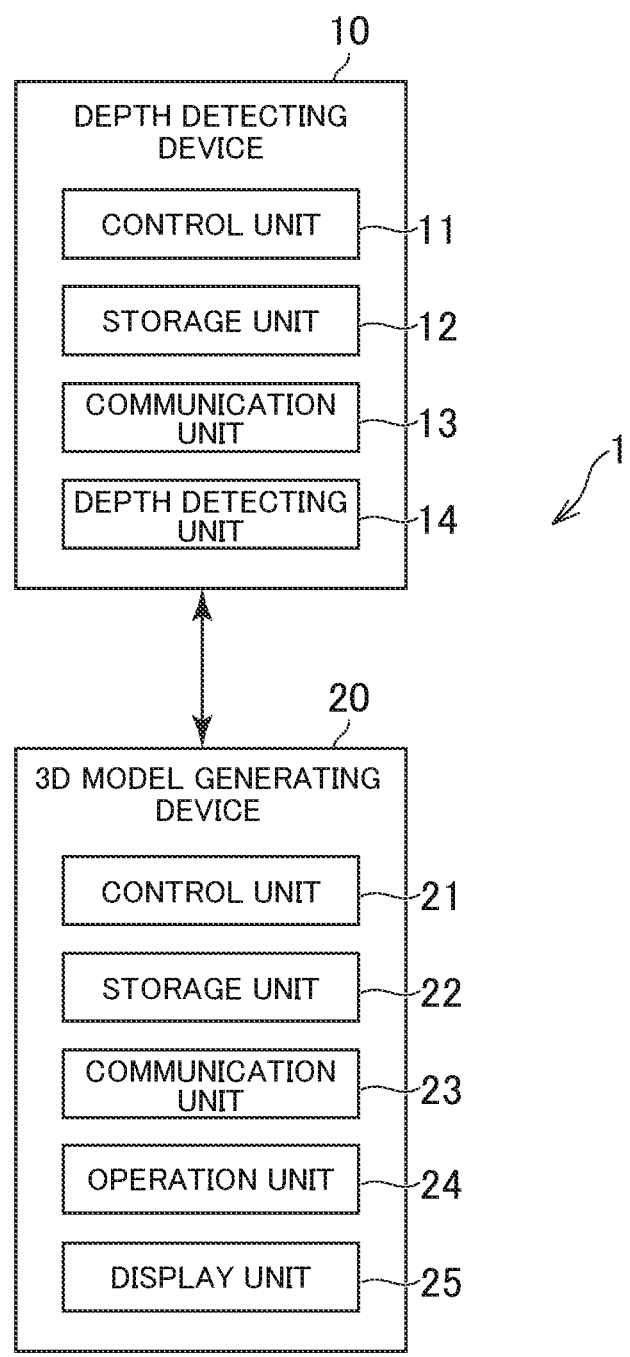
FIG. 2 illustrates the hardware structure of a 3D model generating system.

The following describes an example of an embodiment of a 3D model generating system according to the present invention. FIG. 1 illustrates a situation in which an image capturing object (or an object) is photographed in a 3D model generating system. FIG. 2 illustrates the hardware structure of the 3D model generating system. As illustrated in FIGS. 1 and 2, the 3D model generating system 1 includes a depth detecting device 10 and a 3D model generating device 20. The depth detecting device 10 and the 3D model generating device 20 are connected to each other so as to exchange data through wired or radio communication.

The depth detecting device 10 is a measuring device that detects the depth of an object. For example, the depth detecting device 10 may be a Kinect (registered trademark) sensor. A depth refers to the distance between the depth detecting device 10 and the object. The object is a moving object to be detected and may be, for example, a person, an animal, or clothes he/she/it wears.

The depth detecting device 10 includes a control unit 11, a storage unit 12, a communication unit 13, and a depth detecting unit 14. The control unit 11 includes, for example, one or more microprocessors. The control unit 11 executes processing according to a program and data stored in the storage unit 12. The storage unit 12 includes a main storage unit and an auxiliary storage unit. For example, the main storage unit is a volatile memory, such as a RAM, while the auxiliary storage unit is a non-volatile memory, such as a hard disk or a flash memory. The communication unit 13 includes a network card for wired or radio communication. The communication unit 13 executes data communication via a network.

The depth detecting unit 14 is a depth sensor (a distance camera) that detects a depth, using electromagnetic waves, sound waves, or the like. The depth detecting unit 14 may be, for example, an RGBD camera or a supersonic sensor.

Although the following describes a case in which the depth detecting unit 14 includes an RGBD camera and detects the depth of an object, using infrared radiation, the depth detecting unit 14 can be implemented using publicly known various types of depth sensors.

For example, the RGBD camera of the depth detecting unit 14 includes either a CMOS image sensor or a CCD image sensor and an infrared sensor. The depth detecting unit 14 generates an RGB image of an object, based on a detection signal from the CMOS image sensor or the CCD image sensor. An RGB image is two-dimensional (2D) information of an object and does not include depth information. Specifically, the depth detecting unit 14 emits infrared light from a light emitting element of an infrared sensor and detects infrared light reflected by an object with a light receiving element. The depth detecting unit 14 then estimates the distance to the object, based on the traveling time of the infrared light, or a period of time since emission of the infrared light until receipt of the returned infrared light, to generate depth information. As a method for generating depth information, any of various known methods can be employed, and a light coding method can be used besides the above-mentioned method that detects a traveling time.

Figure 3:
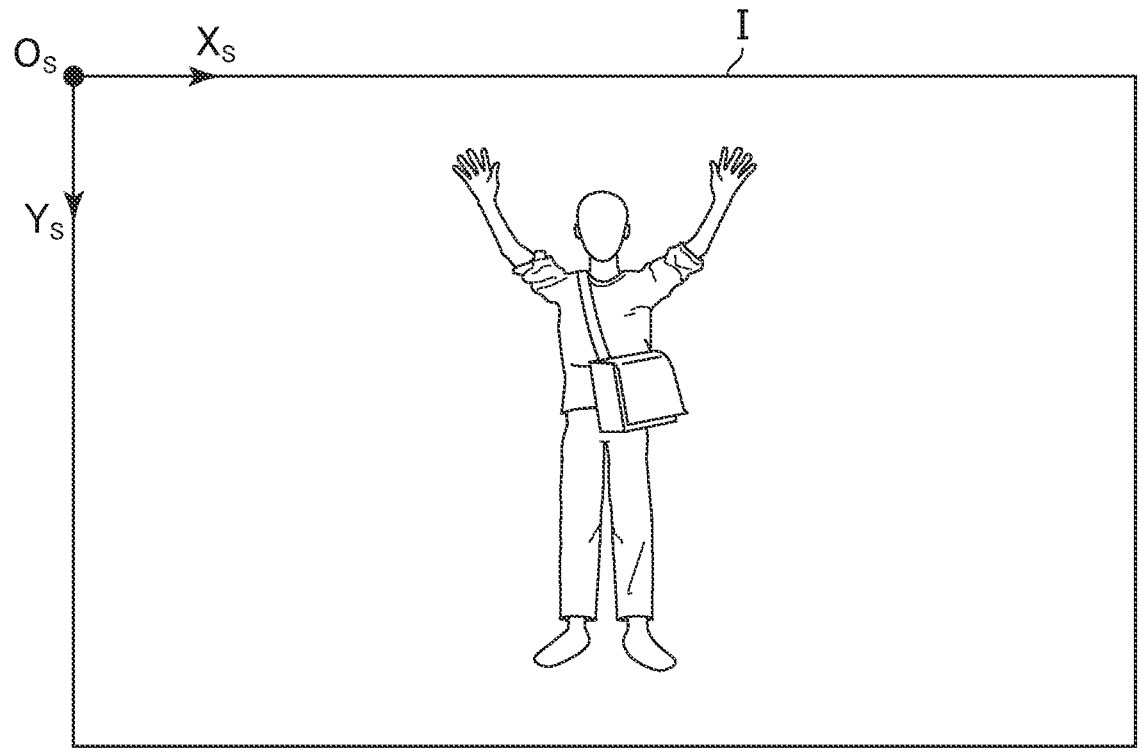
FIG. 3 illustrates one example of depth information.

FIG. 3 illustrates one example of the depth information. As illustrated in FIG. 3, the depth information I here is expressed as a depth image. Thus, each of the pixels in the depth information I is associated with a pixel value indicating a depth. The depth information I may be an image different from an RGB image or may be an RGBD image, or an integrated image of the depth information I and an RGB image. In the case of an RGBD image used as the depth information I, the pixel value of each pixel includes the value of a depth channel in addition to the value of each color channel. In this embodiment, a case in which the depth information I is an image different from an RGB image will be described.

The depth detecting device 10 estimates the position of each of the joints of the object, based on the depth information I detected by the depth detecting unit 14, to obtain a skeleton. Although a skeleton can be obtained using various known extraction methods, a method utilizing template matching is described here as an example. For example, the depth detecting device 10 executes template matching between the depth information I detected by the depth detecting unit 14 and a template image showing the basic shape of the contour of the object to thereby estimate the position (a pixel) of each of the joints of the object, the joints included in the depth information I. Then, the depth detecting device 10 applies predetermined matrix conversion to the depth of each of the joints to thereby estimate the 3D position of the joint. The estimated positions of the respective joints determine the posture of the skeleton and will be hereinafter referred to as detected posture information.

Figure 4:
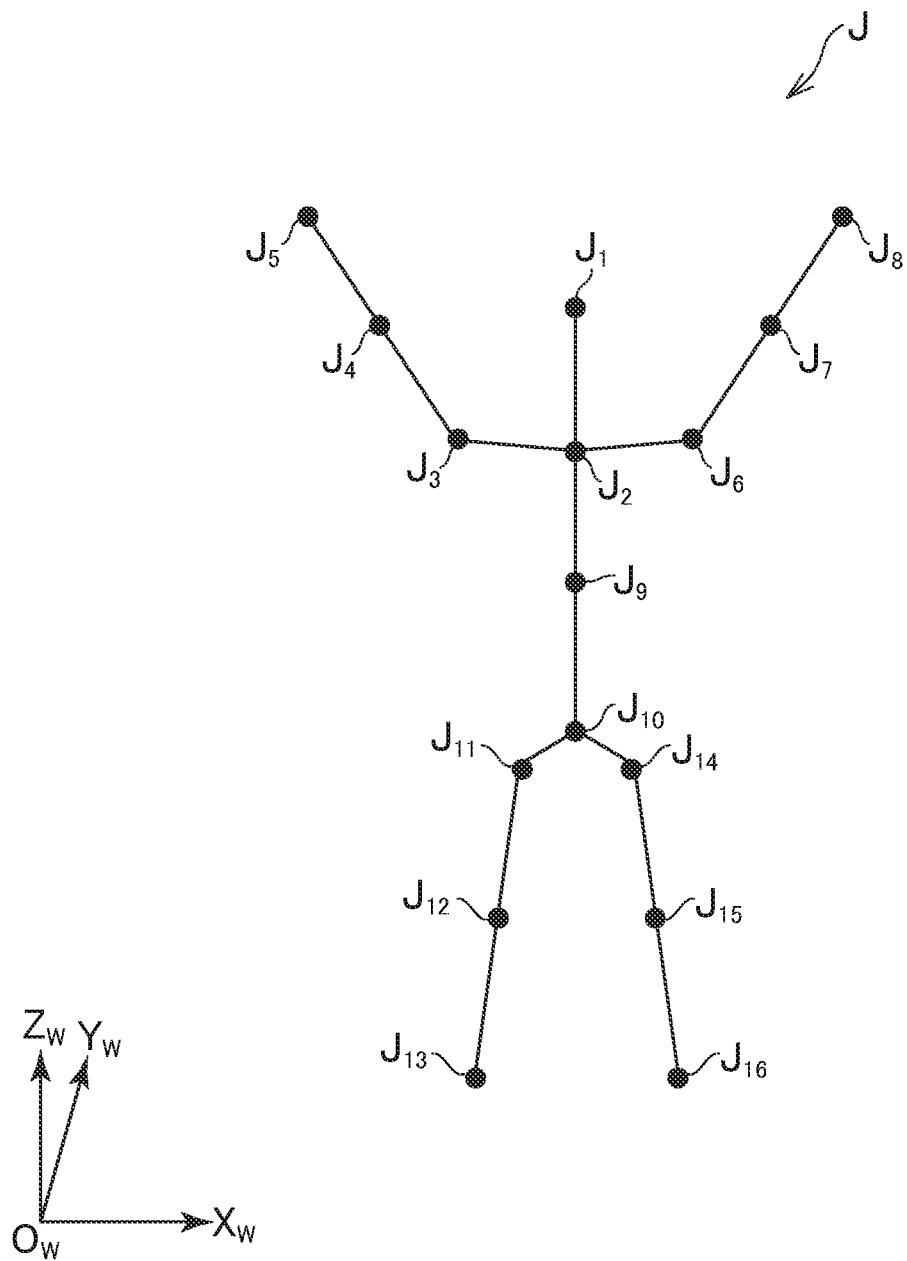
FIG. 4 illustrates one example of detected posture information.

FIG. 4 illustrates one example of the detected posture information. As illustrated in FIG. 4, the detected posture information J includes the 3D coordinate of the respective joints of the object. A case in which the detected posture information J contains the 3D coordinates of a head $J_1$, a point between shoulders $J_2$, a right shoulder $J_3$, a right elbow $J_4$, a right hand $J_5$, a left shoulder $J_6$, a left elbow $J_7$, a left hand $J_8$, a spine $J_9$, a center hip $J_{10}$, a right hip $J_{11}$, a right knee $J_{12}$, a right foot $J_{13}$, a left hip $J_{14}$, a left knee $J_{15}$, and a left foot $J_{16}$ will be described here. In FIG. 4, which illustrates the object viewed from the depth detecting device 10, the left and right positional relationship appears opposite from the actual one. The number of joints included in the detected posture information J can be fewer or greater than the above-mentioned number, namely, sixteen. The detected posture information J indicates the position of a joint that can be determined based on the depth information I, and may include, for example, the position of a wrist or an ankle in addition to the positions mentioned above.

In this embodiment, the depth detecting device 10 generates the depth information I and the detected posture information J at a predetermined frame rate. In other words, the depth detecting device 10 regularly generates the depth information I and the detected posture information J. For example, assuming that the frame rate is at 30 fps, the depth detecting device 10 generates the depth information I and the detected posture information J for every $\frac{1}{30}^{th}$ of a second. In the case where the depth information I and the detected posture information J at a certain time t are referred to, characters $I^t$ and $J^t$ will be hereinafter used as the respective reference characters.

The 3D model generating device 20 is a computer that generates a 3D model, including, for example, a personal computer, a personal digital assistant (including a tablet computer), or a portable phone (including a smart phone). The 3D model generating device 20 includes a control unit 21, a storage unit 22, a communication unit 23, an operation unit 24, and a display unit 25. The hardware structures of the control unit 21, the storage unit 22, and the communication unit 23 are similar to those of the control unit 11, the storage unit 12, and the communication unit 13, respectively, and will not be described here.

The operation unit 24 is an input device for a player to use to operate, including, for example, a pointing device, such as a touch panel or a mouse, or a keyboard. The operation unit 24 transmits the content of an operation by a player to the control unit 21. The display unit 25 is, for example, a liquid crystal display unit or an organic EL display. The display unit 25 displays a screen image in response to an instruction from the control unit 21.

A program and data, described here as being stored in the storage units 12, 22, may be supplied via a network to the storage units 12, 22. The hardware structures of the depth detecting device 10 and the 3D model generating device 20 can be any structures not limited to those mentioned above, and various pieces of computer hardware are applicable. For example, each of the depth detecting device 10 and the 3D model generating device 20 may include a reading unit (for example, an optical disk drive or a memory card slot) that reads a computer readable information storage medium. In this case, a program and data stored in an information storage medium can be supplied to the depth detecting device 10 and the 3D model generating device 20 via the reading unit.

2. Outline of Processing According to the Present Invention

Figure 5:
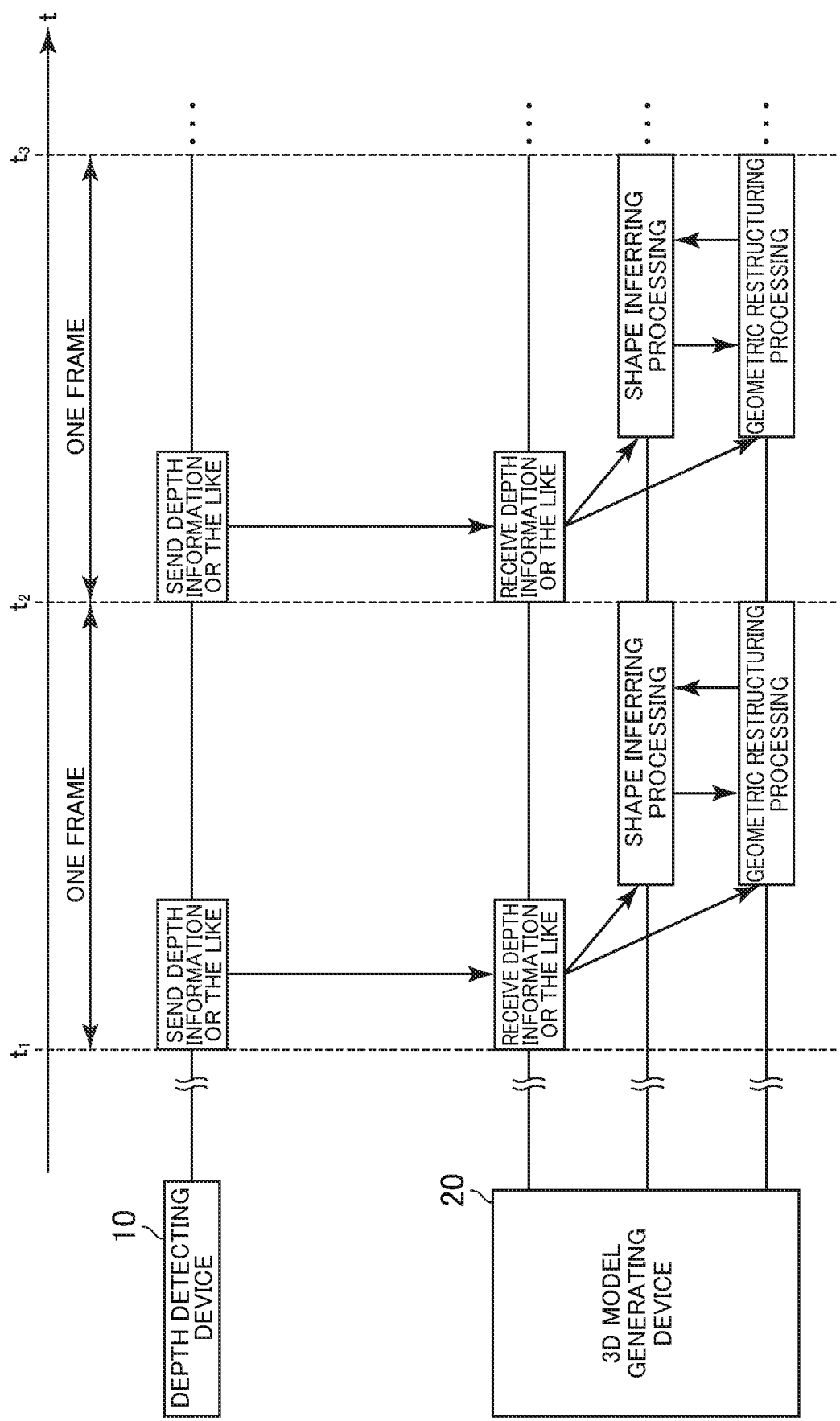
FIG. 5 outlines the processing executed in a 3D model generating system.

FIG. 5 outlines the processing executed by the 3D model generating system 1, in which t indicates a time axis. As illustrated in FIG. 5, the depth detecting device 10 regularly sends the depth information I and the detected posture information J to the 3D model generating device 20. The 3D model generating device 20 receives the depth information I and the detected posture information J at the beginning of each frame and then executes shape inferring processing for inferring the shape of the body (a body line) of an object and geometric restructuring processing for restructuring partial detailed shape (for example, clothes wrinkle), based on the inferred body line. The shape inferring processing and the geometric restructuring processing are executed for every frame.

In the shape inferring processing, a template showing the basic shape of a body is deformed so as to have a posture and a body shape similar to those of the object. The template is a 3D model that represents a body itself and may be, for example, a naked 3D model. The template is composed of a plurality of parts each representing a portion of the body. The template may be prepared in advance using photographed data of the object or 3D CAD. When a template is referred to, the reference character "$M_T$" will be hereinafter added to a 3D model. When a 3D model deformed in the shape inferring processing is referred to, the reference character "$M_S$" will be hereinafter added to a 3D model. A 3D model $M_S$ can be rephrased as a naked 3D model reproducing the posture and body shape of an object.

In the geometric restructuring processing, the 3D model $M_S$ is partially restructured, using the depth information I, such that the detailed shapes, such as clothes wrinkle (the shape of a portion other than the body) are reproduced. When a 3D model in this condition is referred to, the reference character "$M_D$" will be hereinafter used. That is, a 3D model $M_D$ is a 3D model reproducing not only the body line of an object but also what the object wears. With the 3D model $M_D$, the body of the object and the other portions are distinguishable from each other, as to be described later in detail. Supply of the result of geometric restructuring processing to the shape inferring processing can enhance the precision of the 3D model $M_S$.

In this embodiment, the precision of the 3D models $M_S$, $M_D$ is evaluated, using the Bayesian Inference Theory, to improve the precision. The Bayesian Inference Theory is a method for inferring, in a probability point of view, an item to be inferred (or an inference target), based on the result of detection in the real world. The higher the probability according to the Bayesian Inference Theory is, the more likely the inference target actually comes true. In other words, the higher the probability according to the Bayesian Inference Theory is, the more similar to the real object the inferred 3D models $M_S$, $M_D$ are.

The 3D model generating system 1 determines how much to deform the 3D model $M_T$ as a whole and how much to partially restructure the 3D model $M_T$ in order to enhance the probability according to the Bayesian Inference Theory. In this embodiment, three evaluation values, namely, evaluation values $E_S$, $E_D$, and $E_O$, are used to enhance the probability to quickly generate a highly precious 3D model. Specifically, the evaluation value $E_S$ is used to evaluate the extent of an overall deviation between the 3D model $M_S$ and the object; the evaluation value $E_D$ is used to evaluate a partial deviation between the 3D model $M_D$ and the object; the evaluation value $E_O$ is used to prevent such a sharp change that cannot be true. The details of this technique will be described below.

3. Functions Implemented in this Embodiment

Figure 6:
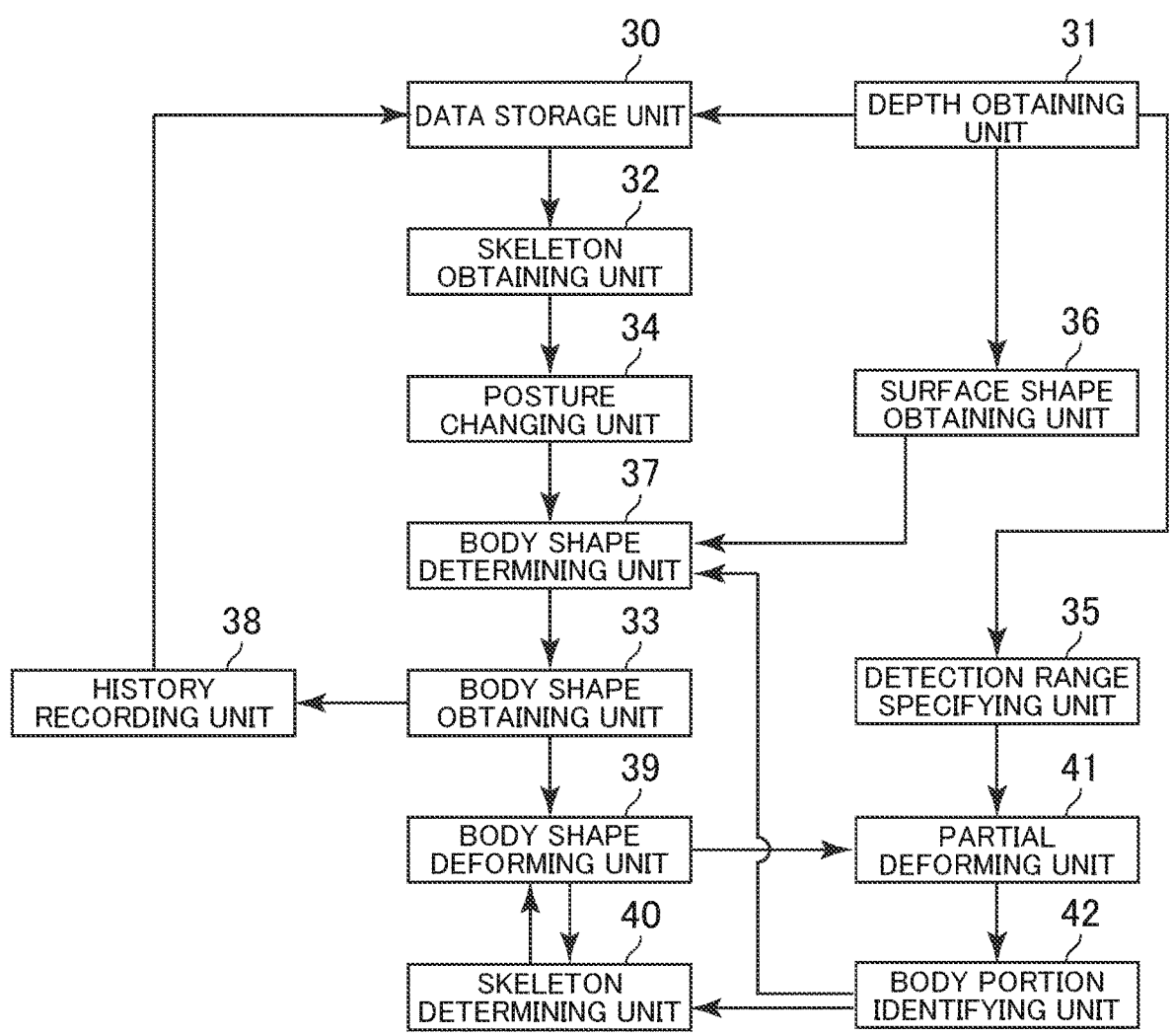
FIG. 6 is a functional block diagram of one example of the functions implemented in a 3D model generating system.

FIG. 6 is a functional block diagram of one example of the functions implemented in the 3D model generating system 1. As illustrated in FIG. 6, a case in which a data storage unit 30, a depth obtaining unit 31, a skeleton obtaining unit 32, a body shape obtaining unit 33, a posture changing unit 34, a detection range specifying unit 35, a surface shape obtaining unit 36, a body shape determining unit 37, a history recording unit 38, a body shape deforming unit 39, a skeleton determining unit 40, a partial deforming unit 41, and a body portion identifying unit 42 are implemented in the 3D model generating device 20 will be described in this embodiment. The body shape determining unit 37 and the skeleton determining unit 40 execute the main processing of the shape inferring processing, while the partial deforming unit 41 executes the main processing of the geometric restructuring processing.

[3-1. Data Storage Unit]

The data storage unit 30 is implemented using mainly the storage unit 22. The data storage unit 30 stores data for generating 3D models $M_S$, $M_D$. As examples of data stored in the data storage unit 30, the following will be described:

(1) depth history data including the history of the depth information I;

(2) skeleton history data including the history of the skeleton parameter (to be described later in detail);

(3) body shape history data including the history of the body shape parameter (to be described later in detail)

(4) movement amount history data including the history of the vertex movement amount (to be described later in detail);

(5) template data defining a 3D model $M_T$;

(6) body history data including the history of the 3D model $M_S$; and (7) restructuring history data including the history of the 3D model $M_D$.

The data stored in the data storage unit 30 is not limited to the above-mentioned examples. For example, the data storage unit 30 may store data including the history of the detected posture information J or data indicating the basic posture of the skeleton $J_T$.

[3-2. Depth Obtaining Unit]

The depth obtaining unit 31 is implemented using mainly the control unit 21. The depth obtaining unit 31 obtains the depth information I of the object, the depth information I being detected by the depth detecting device 10 (FIG. 3). In this embodiment, as the 3D model generating device 20 is directly connected to the depth detecting device 10, the depth obtaining unit 31 receives the depth information I directly from the depth detecting device 10. Alternatively, the depth obtaining unit 31 may indirectly receive the depth information I via other devices. The depth obtaining unit 31 includes the received depth information in the depth history data.

[3-3. Skeleton Obtaining Unit]

The skeleton obtaining unit 32 is implemented using mainly the control unit 21. The skeleton obtaining unit 32 obtains the skeleton parameter of the object, based on the depth information I obtained by the depth detecting device 10. The skeleton parameter is information on the skeleton of the object and indicates the positional relationship of each joint. Although the detected posture information J illustrated in FIG. 4 can be used intact as a skeleton parameter, a case in which the skeleton obtaining unit 32 uses the angle of each of the joints indicated by the detected posture information J as a skeleton parameter will be described here. The skeleton obtaining unit 32 includes the obtained skeleton parameter in the skeleton history data.

Figure 7:
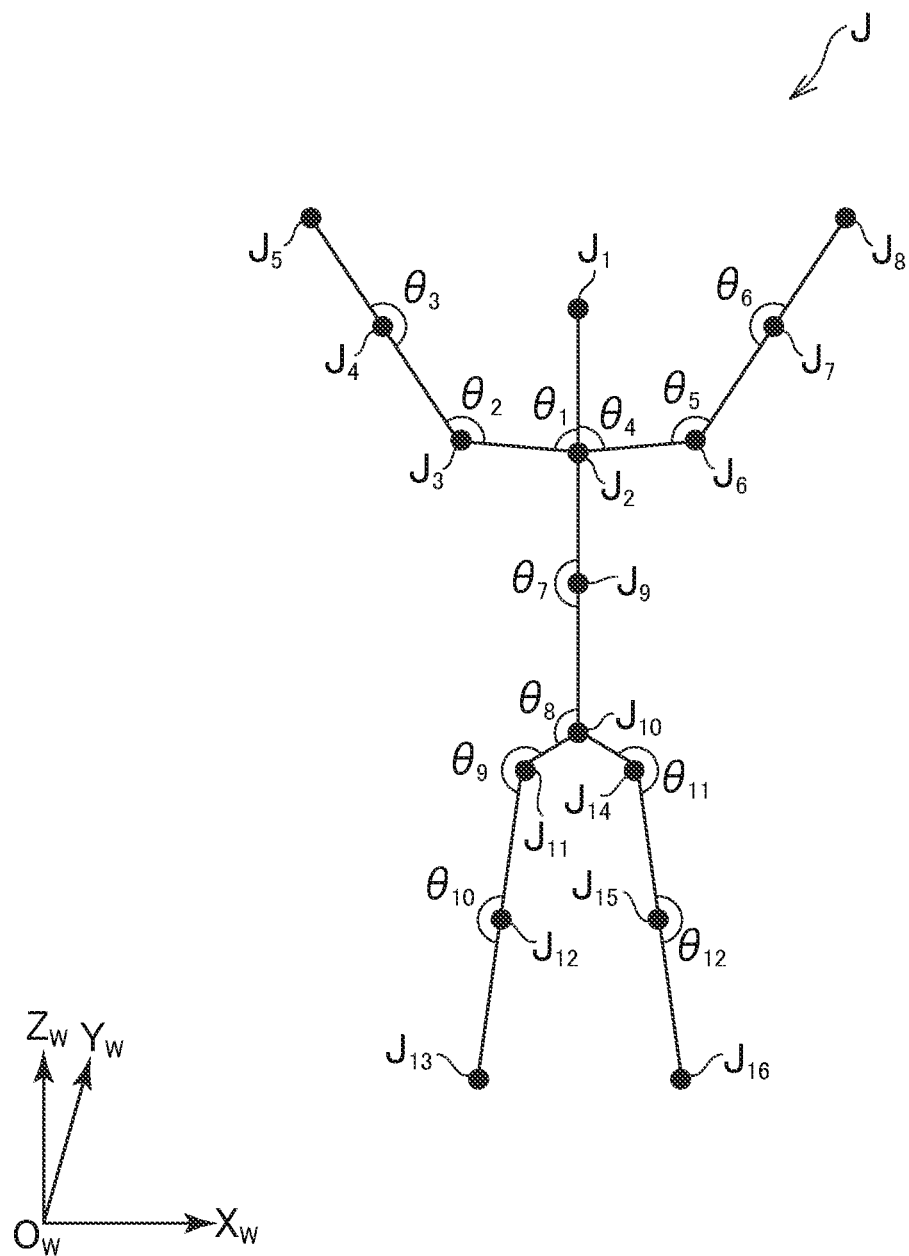
FIG. 7 illustrates a skeleton parameter.

FIG. 7 illustrates a skeleton parameter. As illustrated in FIG. 7, the skeleton obtaining unit 32 calculates the angle $\{\theta_j\}$ of each of the joints indicated by the detected posture information J, based on the 3D coordinates of the joint, as a skeleton parameter. Of the joints indicated by the detected posture information J, the joints other than the end joints each have an angle. In the example in FIG. 7, the skeleton parameter $\{\theta_j\}$ is composed of twelve angles. A skeleton parameter $\{\theta_j\}$ at a certain time t will be hereinafter denoted as $\{\theta^t_j\}$.

[3-4. Body Shape Obtaining Unit]

The body shape parameter obtaining unit is implemented using mainly the control unit 21. The body shape parameter obtaining unit obtains a body shape parameter. In this embodiment, a 3D model $M_T$ that has been deformed based on the body shape parameter makes a 3D model $M_S$. "To morph" here means to change the position and/or the shape of a surface, including, for example, change in the entire dimension or change in a partial shape. The body shape obtaining unit 33 includes the obtained body shape parameter in the body shape history data.

The body shape parameter indicates the characteristics of the body shape of an object, specifically, the dimension of the full body or each portion. For example, the body shape parameter includes the values of a height, a chest, a waist, a width, an inseam, arm lengths, or foot sizes. In this embodiment, the body shape parameter is a combination of a plurality of values and denoted as $\{\beta_k\}$, wherein k is a number that identifies an item included in the body shape parameter, for example, $\beta_1$ for a height, $\beta_2$ for a chest, $\beta_3$ for a waist, and the like. Alternatively, the body shape parameter may be a single value rather than a combination of values.

Figure 8:
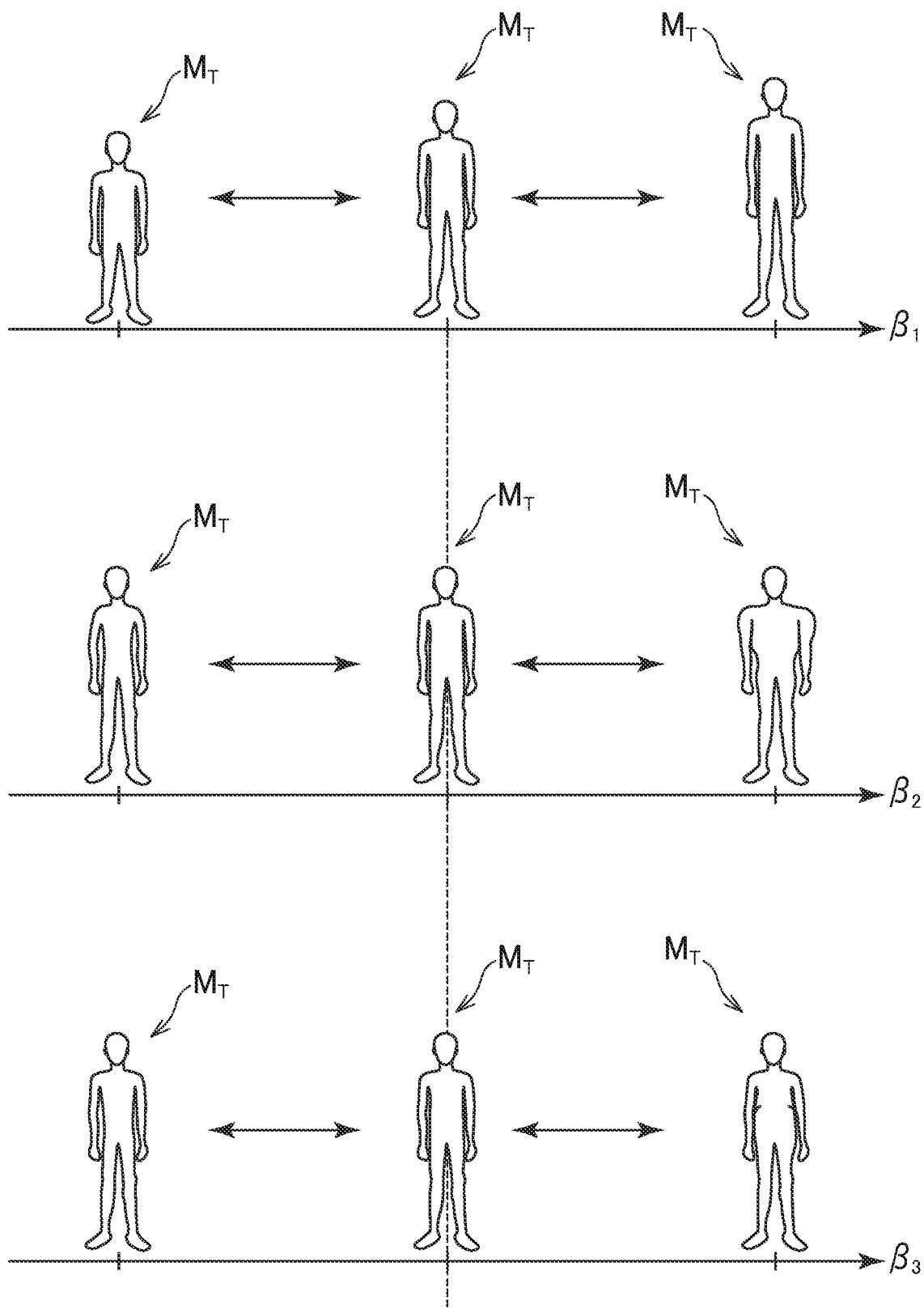
FIG. 8 illustrates a 3D model being deformed based on a skeleton parameter.

FIG. 8 illustrates the 3D model $M_T$ being deformed based on the body shape parameters $\{\beta_k\}$. As illustrated in FIG. 8, the 3D model $M_T$ is deformed so as to have the body shape indicated by the body shape parameters $\{\beta_k\}$. For example, the 3D model $M_T$ is deformed so as to be shorter in response to a smaller $\beta_1$ and taller in response to a larger $\beta_1$. For example, the 3D model $M_T$ is deformed so as to have a smaller chest in response to a smaller $\beta_2$ and a larger chest in response to a larger $\beta_2$. For example, a 3D model $M_T$ is deformed so as to have a thinner waist in response to a smaller $\beta_3$ and a thicker waist in response to a larger $\beta_3$.

The relationship between the body shape parameter $\{\beta_k\}$ and the shape of each part of the 3D model $M_T$ (that is, the position of a vertex) is assumed to be stored in advance in the data storage unit 30. This relationship may be expressed in the form of an expression, a table, or a program code. This relationship is defined such that the 3D model $M_T$ is deformed so as to have the body shape indicated by the body shape parameter $\{\beta_k\}$. The body shape deforming unit 39 to be described later deforms the respective parts of the 3D model $M_T$ so as to have the respective shapes associated with the respective body shape parameters $\{\beta_k\}$, whereby the 3D model $M_T$ is deformed so as to have a body shape in accordance with the body shape parameters $\{\beta_k\}$.

A body shape parameter $\{\beta_k\}$ at a certain time t will be hereinafter denoted as $\{\beta^t_k\}$. Assuming that the time when the depth information I is initially obtained (that is, the start of the processing according to the present invention) is defined as t=0, the body shape parameter $\{\beta^t_k\}$ at that time has the initial value, which is a value indicating the body shape of the template 3D model $M_T$. The body shape parameter $\{\beta^0_k\}$ may be stored in advance in the data storage unit 30. At t=0, the body shape obtaining unit 33 obtains the body shape parameter $\{\beta^0_k\}$ at the initial value stored in the data storage unit 30.

[3-5. Posture Changing Unit]

The posture changing unit 34 is implemented using mainly the control unit 21. The posture changing unit 34 changes the posture of the 3D model $M_T$, based on the skeleton parameter $\{\theta_j\}$, wherein the 3D model $M_T$ can be deformed based on the body shape parameters $\{\beta_k\}$. Specifically, the posture changing unit 34 changes the positional relationship between the respective parts of the 3D model $M_T$ such that the 3D model $M_T$ has a posture indicated by the skeleton parameter $\{\theta_j\}$. The posture corresponds to the positional relationship between the portions of the body, that is, the positional relationship of each joint here.

Figure 9:
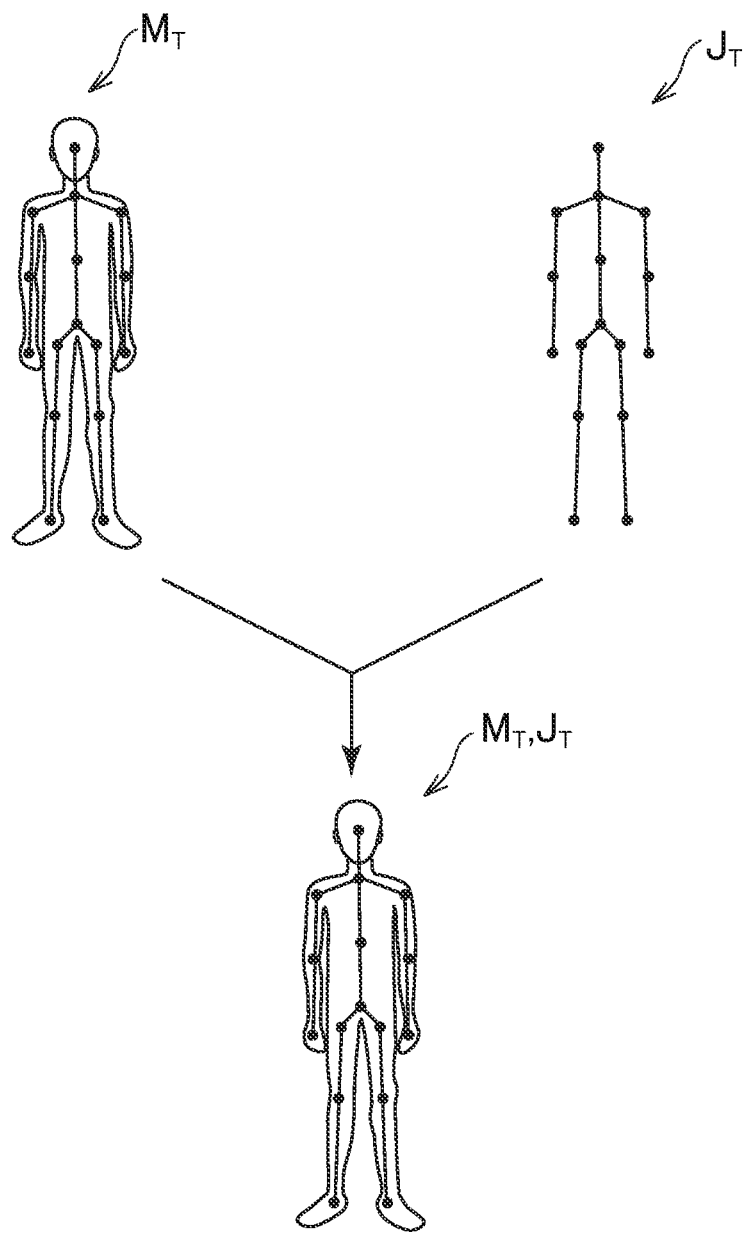
FIG. 9 illustrates a 3D model whose posture is being changed based on a skeleton parameter.
Figure 10:
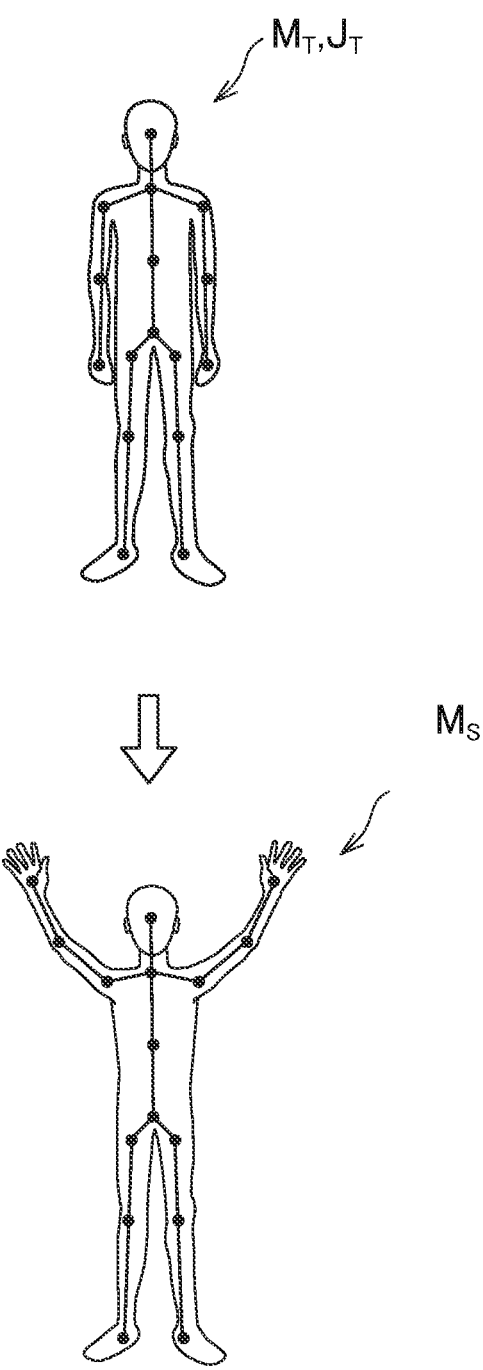
FIG. 10 illustrates a 3D model whose posture is being changed based on a skeleton parameter.

FIGS. 9 and 10 illustrate the 3D model $M_T$ whose posture is being changed based on the skeleton parameter $\{\theta_j\}$. As illustrated in FIG. 9, initially, the posture changing unit 34 sets a skeleton $J_T$ in the basic posture (for example, standing upright) inside the 3D model $M_T$. The positional relationship of each of the joints constituting the skeleton $J_T$ is defined in advance so as to define the posture of the template 3D model $M_T$. With the skeleton $J_T$ set inside the 3D model $M_T$, each of the vertexes of the 3D model $M_T$ is made associated with any of the joints of the skeleton $J_T$. When the skeleton $J_T$ is deformed and each of the joints accordingly moves, a vertex associated with a joint moves so as to maintain a predetermined positional relationship with the joint. That is, a vertex associated with a joint interlinks with the joint.

The posture changing unit 34 deforms the skeleton $J_T$ such that the positional relationship of each of the joints indicated by the skeleton parameter $\{\theta_j\}$ matches with the positional relationship of the corresponding joint of the skeleton $J_T$. That positional relationships match with each other means that the positions of the two relevant joints coincide with each other or deviate from each other by an amount less than a predetermined amount. Some positional deviation is tolerated because the distance between the real joints of the object does not always coincide with the distance between the corresponding joints of the skeleton $J_T$, and complete matching of such 3D coordinates is difficult to achieve.

In this embodiment, for overall resemblance in posture, the posture changing unit 34 deforms the skeleton $J_T$ such that the angles of the respective joints of the skeleton $J_T$ match with, or deviate from by an amount less than a reference value, the skeleton parameter $\{\theta_j\}$. As described above, the respective vertexes of the 3D model $M_T$ interlink with the respective associated joints. Thus, as illustrated in FIG. 10, deforming the skeleton $J_T$ by the posture changing unit 34 can produce a 3D model $M_S$ in a posture similar to the posture of the object.

[3-6. Detection Range Specifying Unit]

The detection range specifying unit 35 is implemented using mainly the control unit 21. The detection range specifying unit 35 specifies a part of the 3D model $M_S$, based on the depth information I, the part corresponding to the range (or a detection range) detected by the depth detecting device 10. In other words, the detection range is a detectable area on the surface of the object, that is, an area where infrared light from the depth detecting device 10 reflects. For example, the detection range specifying unit 35 determines the orientation of the depth detecting device 10 in a 3D space, based on the depth information I, and specifies a detection range, based on the relationship between the determined orientation and the orientation of the surface of the 3D model $M_S$.

Figure 11:
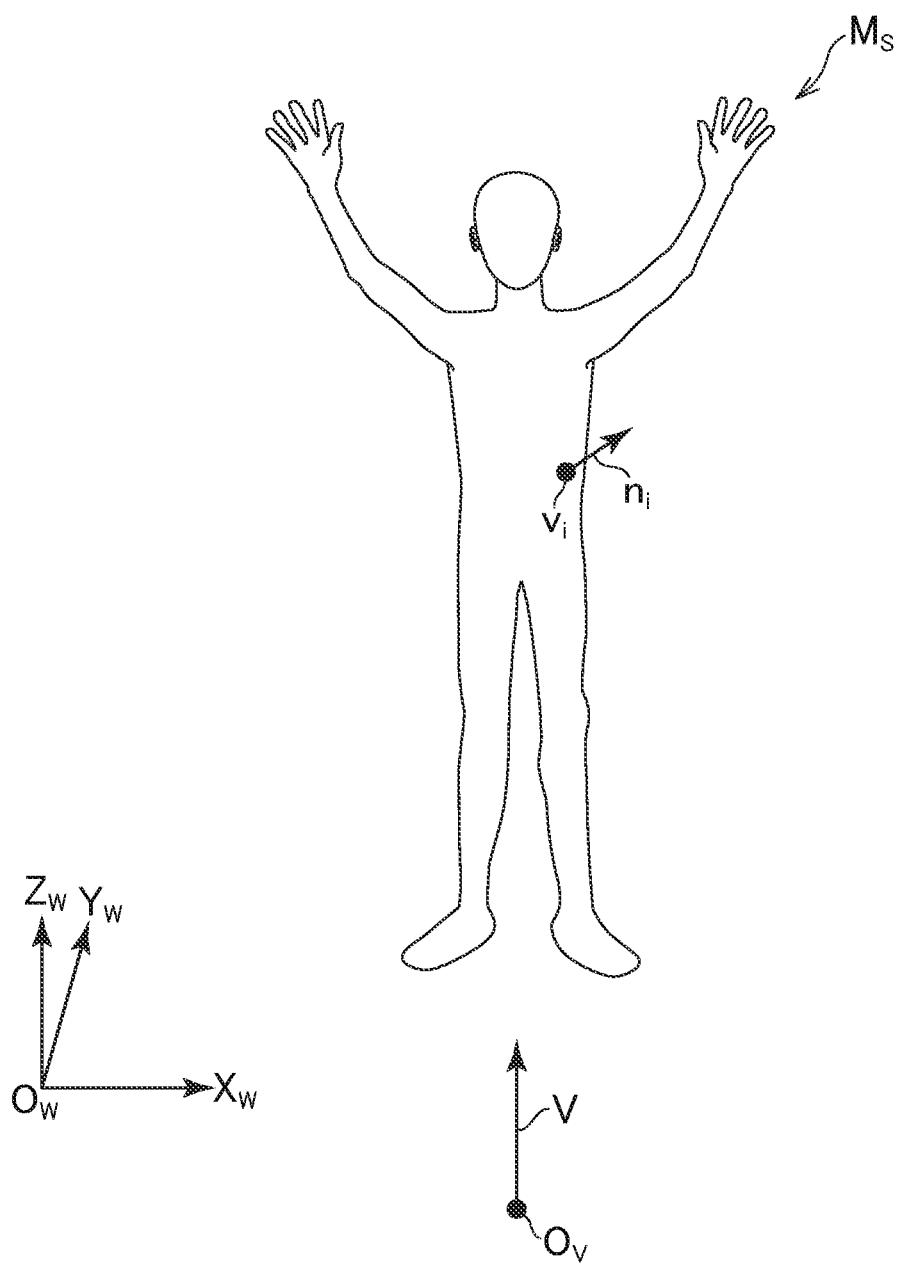
FIG. 11 is a diagram to explain the processing by a detection range specifying unit.

FIG. 11 is a diagram to explain the processing by the detection range specifying unit 35. As illustrated in FIG. 11, the direction V of the line of sight (or the sight line direction V) (that is, the direction of emission of the infrared light) of the depth detecting device 10 is used as the orientation of the depth detecting device 10. The detection range specifying unit 35 obtains a view point $O_V$ and the sight line direction V in the 3D space, based on the depth information I. The view point $O_V$ is the origin of the viewpoint coordinate system, and the sight line direction V is the Z axis of the viewpoint coordinate system (the coordinate axes in FIG. 11 are those in the world coordinate system).

For example, the detection range specifying unit 35 obtains the position of the view point $O_V$ and the sight line direction V of the depth detecting device 10 in the 3D space, based on the fixation point for the depth information I (that is, the center pixel of the image). Then, the detection range specifying unit 35 specifies a vertex $v_i$ inside the detection range, based on the relationship between the normal $n_i$ of each vertex $v_i$ of the 3D model and the sight line direction V, in which the normal $n_i$ can be defined by a cross product of inter-vertex vectors. The detection range specifying unit 35 determines that a vertex $v_i$ with the normal $n_i$ facing the sight line direction V (for example, the angle between the normal $n_i$ and the sight line direction V being 90° or greater) is defined inside the detection range, and other vertexes are outside the range.

[3-7. Surface Shape Obtaining Unit]

The surface shape obtaining unit 36 is implemented using mainly the control unit 21. The surface shape obtaining unit 36 obtains the shape of the surface (or a surface shape) (illustrated in FIG. 12 to be referred to later) of the object, based on the depth information I. The surface shape of the object is the shape of a part of the object, the part detected by the depth detecting device 10, that is, an area included as depths in the depth information I. The surface shape of the object is the 3D coordinates obtained through predetermined matrix conversion applied to the depth information I, in other words, obtained by converting the depths of the respective pixels included in the depth information I into a 3D space. In the case where the positional relationship between the depth detecting device 10 and the object is such as is illustrated in FIG. 1, the surface shape obtaining unit 36 obtains the shape of only the front surface of the object, but not the shape of the rear surface.

[3-8. Body Shape Determining Unit]

The body shape determining unit 37 is implemented using mainly the control unit 21. The body shape determining unit 37 determines a body shape parameter, based on the difference in surface shape between the 3D model in a posture changed by the posture changing unit 34 and the object. The difference in shape is a positional difference in the 3D space, and is, for example, the distance between vertexes. The body shape determining unit 37 changes the body shape parameter such that the difference in shape becomes smaller. That is, the body shape determining unit 37 changes the body shape parameter such that the difference after change in the body shape parameter becomes smaller than that before the change.

Figure 12:
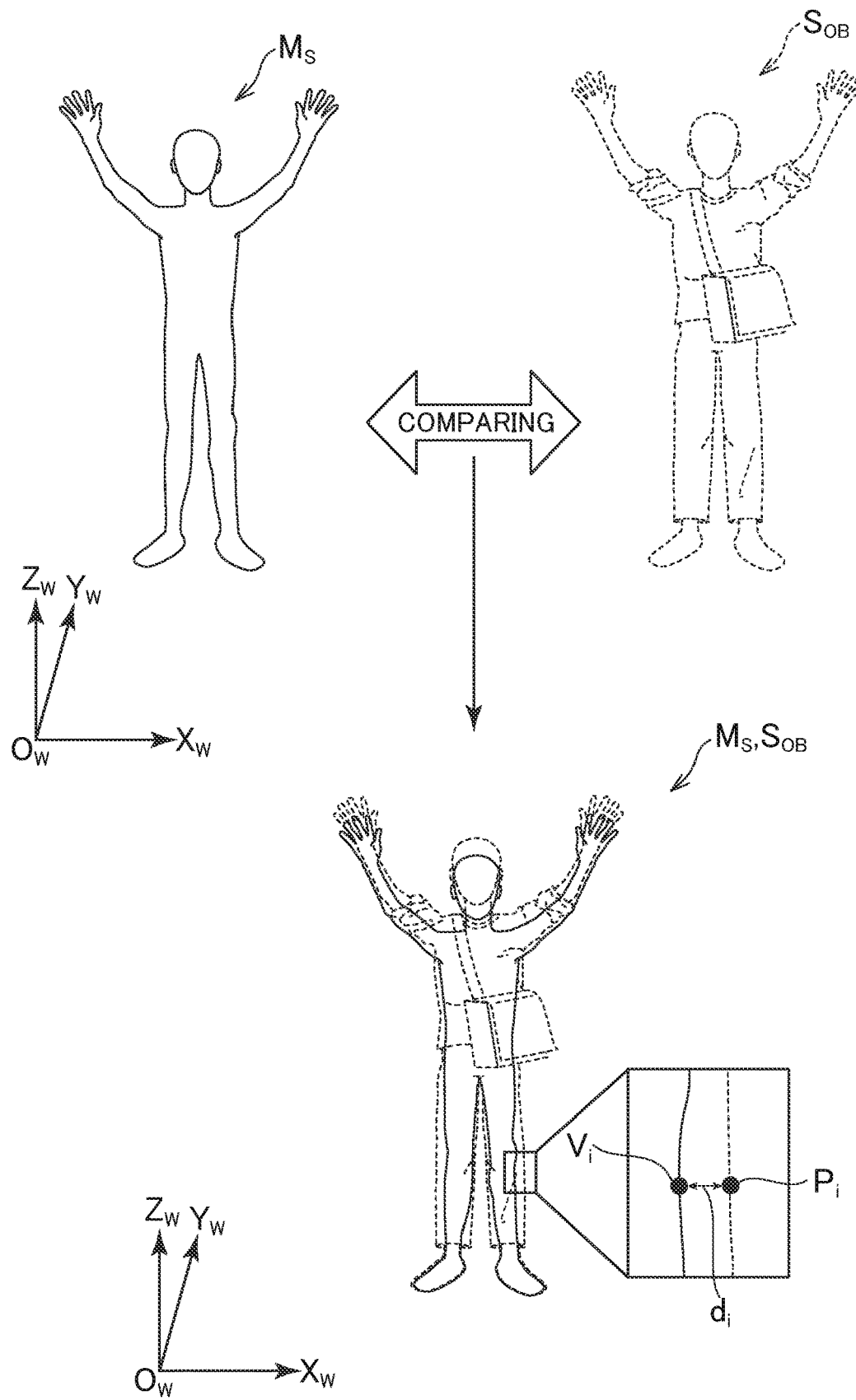
FIG. 12 is a diagram to explain the processing by a body shape determining unit.

FIG. 12 is a diagram to explain the processing by the body shape determining unit 37, wherein the solid line represents the 3D model $M_S$ and the broken line represents the surface $S_{OB}$ of the object. Initially, the body shape determining unit 37 obtains an evaluation value $E_S$ indicative of an overall deviation between respective vertexes of the 3D model $M_S$ and points on the surface $S_{OB}$ of the object, based on the vertexes and the points. The evaluation value $E_S$ can be considered as an evaluation value $E_S$ indicating comprehensive evaluation of the distances $d_i$ between the 3D coordinates of the respective vertexes $v_i$ and those of the corresponding points $P_i$. In other words, the evaluation value $E_S$ indicates the precision of the 3D model $M_S$.

For example, the body shape determining unit 37 substitutes the distance $d_i$ into a predetermined expression to obtain an evaluation value $E_S$. An evaluation value $E_S$ at a certain time t will be hereinafter denoted as $E^t_S(X^t)$. The surface shape of the 3D model $M_S$ at time t is determined based on the body shape parameter $\{\beta^t_k\}$ and the skeleton parameter $\{\theta^t_j\}$. Assuming that the combination of the body shape parameter $\{\beta^t_k\}$ and the skeleton parameter $\{\theta^t_j\}$ is denoted as $X^t$ (that is, $X^t=\{\beta^t_k, \theta^t_j\}$), the evaluation value $E^t_S(X^t)$ can be expressed as a function of a variable $X^t$, and can be obtained with Expression 1 below.

$$E^t_s(X^t) = \sum_{i \in M_s} \mu^t_i vis(v^t_i, p^t_i) \qquad \text{[Expression 1]}$$

The term "$\mu^t_i$" in Expression 1 is a weighting coefficient (for example, a value equal to or greater than 0 and equal to and less than 1 here). The weighting coefficient $\mu^t_i$ is a coefficient for reducing or eliminating the influence of the deviation of a portion (for example, clothes wrinkle) other than the body on the evaluation value $E^t_S(X^t)$. That is, because the deviation of a portion other than the body is not reliable in obtaining an evaluation value $E^t_S(X^t)$, a weighting coefficient $\mu^t_i$ is used to make larger the weight for a portion assumed as the body and smaller the weight for a portion other than the body. A weighting coefficient μti is obtained by a method to be described later.

The term "$v^t_i$" in Expression 1 indicates each vertex of the 3D model $M_S$ at time t. The term "$p^t_i$" indicates a point closest to the vertex $v^t_i$ among those on the surface $S_{OB}$ of the object. The term "$vis(v^t_i, p^t_i)$" is a function containing a conditional expression, that returns the distance between the vertex $v^t_i$ and the point $p^t_i$ when the vertex $v^t_i$ is positioned inside the detection range and a predetermined value $\lambda_S$ when the vertex $v^t_i$ is positioned outside the detection range. A predetermined value $\lambda_S$ is returned because a point $p^t_i$ corresponding to a vertex $v^t_i$ outside the detection range is not available, and a distance thus cannot be obtained. The predetermined value $\lambda_S$, which may be any value, may be about 0.1 as the predetermined value $\lambda_S$ being 0 can lead to reduction in dimension of the 3D model. As expressed by Expression 1, the body shape determining unit 37 obtains either the distance to a corresponding point $p^t_i$ or a predetermined value $\lambda_S$ for every vertex $v^t_i$, then multiples the distance or the predetermined values $\lambda_S$ by a weighting coefficient $\mu^t_i$, and obtains the sum of the results of multiplication as the evaluation value $E^t_S(X^t)$.

In this embodiment, the body shape determining unit 37 optimizes the body shape parameter $\{\beta_k\}$, based on the evaluation value $E_S$. For example, the body shape determining unit 37 initially selects a plurality of candidates for the body shape parameter $\{\beta_k\}$ and then determines a candidate value that makes a minimum evaluation value $E_S$ or an evaluation value $E_S$ less than a threshold as the body shape parameter $\{\beta_k\}$. Although the optimization can be made by various optimization algorithms, a case in which Particle Swarm Optimization (PSO) is utilized will be described here as an example.

The body shape determining unit 37 selects a plurality of candidates for the body shape parameter $\{\beta_k\}$ by Particle Swarm Optimization. Specifically, the body shape determining unit 37 initializes the body shape parameter $\{\beta_k\}$, based on the evaluation value $E_0$ obtained by Expression 2 here to be described later, and selects a plurality of candidates, based on the initialized body shape parameter $\{\beta_k\}$. For example, a value with a difference from the initialized body shape parameter $\{\beta_k\}$ by an amount within a predetermined range is selected as a candidate. Any number of candidates, for example, about thirty candidates, can be selected. The body shape determining unit 37 calculates an evaluation value $E_S$ for every candidate and selects one of the candidates. For example, the body shape determining unit 37 may select a candidate value that makes a minimum evaluation value $E_S$ as a new body shape parameter $\{\beta_k\}$. The body shape determining unit 37 hands the optimized body shape parameter $\{\beta_k\}$ to the body shape deforming unit 39 to update the 3D model $M_S$.

As described above, in this embodiment, with use of the weighting coefficient $\mu^t_i$ in calculation of the evaluation value $E_S$, the body shape determining unit 37 makes larger the weight (that is, a weighting coefficient $\mu^t_i$) for the difference relevant to the body portion than that for the difference relevant to the other portions in determination of the body shape parameter $\{\beta_k\}$. Additionally, in this embodiment, with use of the conditional function vis($v'_i$, $\mu^t_i$), the body shape determining unit 37 determines the body shape parameter, based on the difference in surface shape between the 3D model and the object in the detection range.

As the depth information I is repetitively obtained at a predetermined frame rate, the body shape determining unit 37 will repetitively execute the above described optimization processing. The body shape determining unit 37 may execute optimization only once in one frame or repetitively until the next frame to thereby make the evaluation value $E_S$ as small as possible. Further, the body shape determining unit 37 may hold a body shape parameter $\{\beta_k\}$ that makes the evaluation value $E_S$ less than a threshold so that optimization is no longer executed until receipt of the depth information I for the next frame.

Although it is possible that the skeleton parameter $\{\theta_j\}$ changes abruptly as the object is a moving body, it cannot be possible that the body shape parameter $\{\beta_k\}$ changes abruptly as the body shape of the object does not change abruptly. However, for example, if the depth information I for a certain frame contain lots of noises by chance, the body shape parameter $\{\beta_k\}$ can change abruptly from that for the previous frame according to calculation. In this case, the 3D model $M_S$ will sharply inflate or shrink. In order to avoid such occurrence, the body shape determining unit 37 may obtain the initial value of the body shape parameter $\{\beta_k\}$ for a certain frame, based on the previous value, to prevent variation of the body shape parameter $\{\beta_k\}$. Although the initial value can be obtained by substituting a previous body shape parameter $\{\beta_k\}$ into a predetermined expression, a case in which the initial value of the body shape parameter $\{\beta_k\}$ is determined based on the evaluation value $E_0$ will be described in this embodiment. The evaluation value $E_0$ can be expressed as a function with the body shape parameter $\{\beta_k\}$ as a variable, like Expression 2 below.

$$E_0(\{\beta_k\}) = \sum_{t=0}^{r} d(\{\beta_k\}, \{\beta^t_k\}) \quad \text{[Expression 2]}$$

The character "d" in Expression 2 indicates a distance in the principal component analysis space (a so-called PCA space, or a k-dimensional space here where the body shape parameter $\{\beta_k\}$ is expressed), and the character "r" indicates any time. The right side of Expression 2 indicates the sum of the distances each between a candidate value for the body shape parameter $\{\beta_k\}$ and the body shape parameter $\{\beta^t_k\}$ at each time t. Accordingly, the left side of Expression 2 indicates overall deviation of a candidate value for the body shape parameter $\{\beta_k\}$ from the previous body shape parameter $\{\beta_k\}$. In this embodiment, the body shape determining unit 37 executes initialization based on a body shape parameter $\{\beta_k\}$ that makes a minimum evaluation value $E_0(\{\beta_k\})$ or an evaluation value $E_0(\{\beta_k\})$ less than a threshold.

In Expression 2, the evaluation value $E_0(\{\beta_k\})$ is minimized in the case of the average of the previous body shape parameters $\{\beta_k\}$. Thus, the body shape determining unit 37 executes initialization, based on the average of the previous body shape parameters $\{\beta_k\}$. This can prevent an abrupt change of the body shape parameter $\{\beta_k\}$ occurring only at a certain time t. The average may involve the whole previous period or only a predetermined immediate previous period. Further, although Expression 2 includes no coefficient, a coefficient may be included depending on the time t. In this case, a weighted average with a larger weight for a time closer to the present may be employed. As described above, in this embodiment, the body shape determining unit 37 determines the body shape parameter $\{\beta_k\}$ based on the body shape parameter $\{\beta_k\}$ and the history recorded by the history recording unit 38.

[3-9. History Recording Unit]

The history recording unit 38 is implemented using mainly the control unit 21. The history recording unit 38 stores the history of the body shape parameter $\{\beta_k\}$ in the data storage unit 30. The history recording unit 38 includes the body shape parameters $\{\beta_k\}$ in time series or so as to be associated with the time of optimization in the body shape history data.

[3-10. Body Shape Deforming Unit]

The body shape deforming unit 39 is implemented using mainly the control unit 21. The body shape deforming unit 39 deforms the 3D model $M_T$, based on the body shape parameter determined by the body shape parameter determining unit. Specifically, the body shape deforming unit 39 changes the positions of the vertexes of the 3D model $M_T$ to thereby deform the 3D model $M_T$. That is, as the vertexes are points that define each polygon, change in the position of a vertex leads to change in at least one of the position and shape of each part of the 3D model $M_T$. In other words, the body shape deforming unit 39 will move or morph a polygon constituting the 3D model $M_T$. Although a case in which a triangular polygon is used is described here, a quadrilateral polygon, a pentagonal polygon, or a polygon with more vertexes than a pentagon can be used.

FIG. 13 illustrates the 3D model $M_S$ being changed when optimization is made. As illustrated in FIG. 13, as the 3D model $M_S$ (the solid line) before optimization is shorter in height than the surface $S_{OB}$ (the broken line) of the object, the body shape determining unit 37 makes larger the parameter $\beta1$ for a height for optimization to make taller the 3D model $M_S$. Then, the body shape deforming unit 39 updates the 3D model $M_S$, based on the optimized body shape parameter $\{\beta_k\}$. As a result, the 3D model $M_S$ has a height similar to the real height of the object.

[3-11. Skeleton Determining Unit]

The skeleton determining unit 40 is implemented using mainly the control unit 21. The skeleton determining unit 40 determines the skeleton parameter $\{\theta_j\}$, based on the difference in surface shape between the 3D model $M_S$ and the object. Specifically, the skeleton determining unit 40 determines the skeleton parameter $\{\beta_j\}$, based on the evaluation value $E_S$, for optimization of the skeleton parameter $\{\theta_j\}$ because it is difficult to make the posture of the 3D model $M_S$ same as that of the object, based solely on the skeleton parameter $\{\theta_j\}$ obtained by the skeleton obtaining unit 32, based on the detected posture information J.

For example, the skeleton determining unit 40 selects a plurality of candidates for the skeleton parameter $\{\theta_j\}$ and determines a candidate value that makes a minimum evaluation value $E_S$ or an evaluation value $E_S$ less than a threshold as the skeleton parameter $\{\theta_j\}$. Although optimization can be achieved by any of various optimizing algorithms, an optimization method using least squares is used here to determine the skeleton parameter $\{\theta_j\}$.

The skeleton determining unit 40 selects a plurality of candidates for the skeleton parameter $\{\theta_j\}$, based on the least squares. For example, a value with a difference from the current skeleton parameter $\{\theta_j\}$ by an amount within a predetermined range can make such a candidate. Any number of candidates can be selected. The body shape determining unit 37 calculates an evaluation value $E_S$ for every candidate and selects one of the candidates. For example, the body shape determining unit 37 selects a candidate value that makes a minimum evaluation value $E_S$ as a new skeleton parameter $\{\theta_j\}$. The posture changing unit 34 updates the posture of the 3D model $M_S$, based on the skeleton parameter $\{\theta_j\}$ determined by the skeleton determining unit 40.

[3-12. Partial Deforming Unit]

The partial deforming unit 41 is implemented using mainly the control unit 21. The partial deforming unit 41 deforms apart of the surface shape of the 3D model $M_S$ deformed by the body shape deforming unit 39, based on the difference in surface shape between the part and a corresponding part of the object. For example, the partial deforming unit 41 obtains an amount, or a vertex movement amount, by which to move each of the vertexes of the 3D model $M_S$ in order to have the vertex positioned as it should be, based on the partial deviation in surface shape between the 3D model $M_S$ and the object. The vertex movement amount indicates a position to which a vertex v, of the 3D model $M_S$ should be moved to reproduce partial details of the object.

Figure 14:
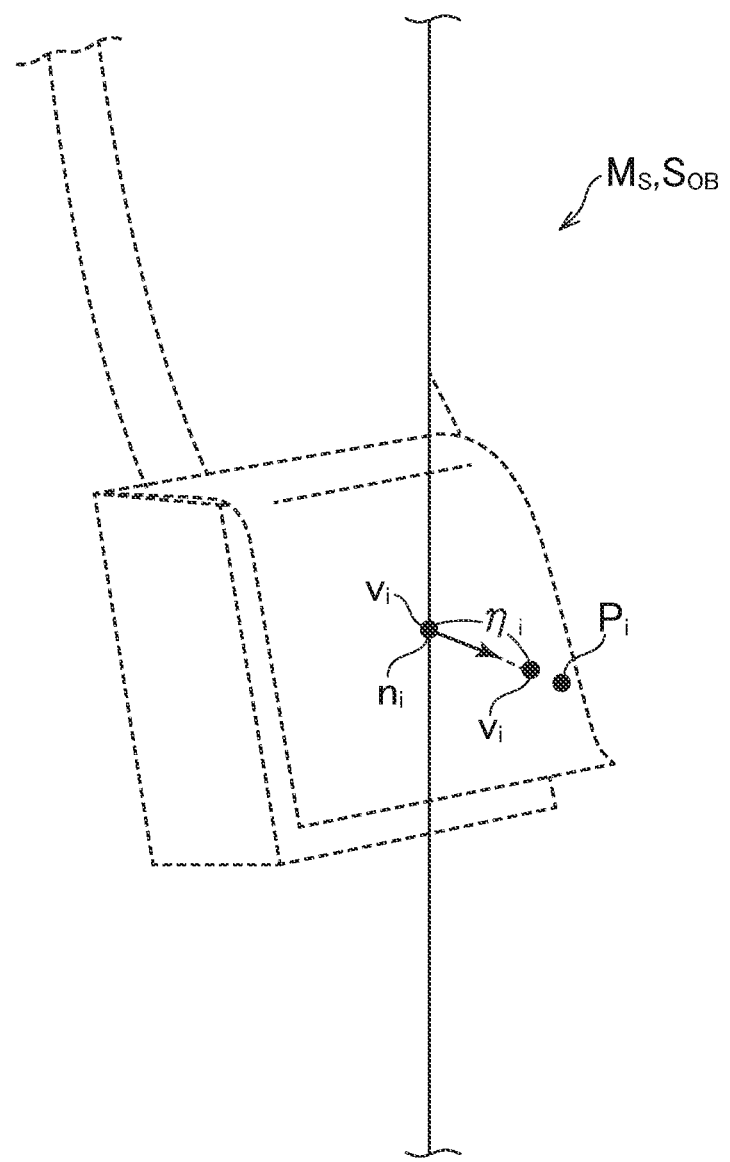
FIG. 14 is a diagram to explain a vertex movement amount.

FIG. 14 is a diagram to explain the vertex movement amount. FIG. 14 illustrates enlarged an area near the belly of the 3D model $M_S$ and of the object, wherein the solid line represents the 3D model $M_S$, and the broken line represents the surface $S_{OB}$ of the object, similar to FIG. 12. Although the vertex movement amount can be any information that can identify a vertex $v_i$ (or a destination vertex $V_i$) to which a vertex $v_i$ is to be moved, a case in which the vertex movement amount is a movement amount $\eta_i$ by which to move a vertex $v_i$ in the direction of the normal $n_i$, as illustrated in FIG. 14, will be described in this embodiment.

The vertex movement amount is not limited to the movement amount $\eta_i$ and can be the 3D coordinates of the destination vertex $v_i$ or vector information indicating a movement direction and a movement amount. The partial deforming unit 41 can obtain the vertex movement amount $\eta_i$ by substituting the 3D coordinates of a vertex $v_i$ and those of a point $p_i$ closest to the vertex $V_i$, on the surface shape of the object into a predetermined expression. The expression is defined such that a larger deviation in 3D coordinates between the vertex $v_i$ and the point $p_i$ leads to a larger vertex movement amount $\eta_i$ and a smaller deviation leads to a smaller vertex movement amount $\eta_i$.

In this embodiment, a case in which the vertex movement amount $\eta_i$ is obtained using the evaluation value $E_D$ will be described. The evaluation value $E_D$ is an evaluation value indicating the extent of deviation between the 3D model $M_S$ deformed based on the vertex movement amount $\eta_i$ and the surface $S_{OB}$ of the object. As a 3D model $M_S$ deformed based on the vertex movement amount $\eta_i$ is denoted as "$M_D$" here, the evaluation value $E_D$ can be rephrased as indicating the precision of a 3D model $M_D$. An evaluation value $E_D$ at a certain time t will be hereinafter denoted as $E^t_D$. The evaluation value $E^t_D$ will change in accordance with the vertex movement amount $\eta_i$, and thus can be denoted as a function $E^t_D(\eta_i)$ with the vertex movement amount $\eta_i$ as a variable. In this embodiment, the partial deforming unit 41 obtains the evaluation value $E^t_D(\eta_i)$, using Expression 3 below.

$$E^t_D(\eta_i) = \sum_{i \in S^t} \|p^t_i - (v^t_i + \eta_i, n_i)\|_2 + \lambda_D \sum_{j \in N(i)} \|\eta_i - \eta_j\|_2 \qquad \text{[Expression 3]}$$

The character $S^t$ in the first term on the right side of Expression 3 indicate the surface of the 3D model $M_S$. The first term on the right side of Expression 3 is obtained by calculating, for every vertex $v^t_i$, the distance between the point $p^t_i$ on the object at a certain time t and a point $v_i'$ to which the vertex $v^t_i$ has moved in the direction of the normal $n_i$ by the vertex movement amount $\eta_i$ and summing the distances relevant to the respective vertexes $v^t_i$. Meanwhile, the character $N(i)$ in the second term on the right side of Expression 3 indicates a vertex adjacent to the vertex $v_i$, and $\lambda_D$ indicates a hyper parameter. Specifically, the second term on the right side of Expression 3 indicates the sum of the differences each between the vertex movement amount $\eta_i$ of the vertex $v^t_i$ and the vertex movement amount $\eta_j$ of its adjacent vertex. When this value is large, it is possible that the vertex $v^t_i$ projects relative to its neighboring vertexes, forming an unrealistic shape having a local projection. In order to prevent such an unnatural shape and to reproduce a natural surface, the second term on the right side of Expression 3 is defined in this embodiment. The second term on the right side of Expression 3, however, is omissible.

The partial deforming unit 41 obtains the vertex movement amount $\eta_i$ of each vertex $v_i$, based on the evaluation value $E_D$. As a smaller evaluation value $E_D$ means a smaller difference in surface shape between the 3D model $M_D$ and the object, that is, higher precision, the partial deforming unit 41 obtains a vertex movement amount $\eta_i$ that makes a minimum evaluation value $E_D$ or an evaluation value $E_D$ less than a threshold. A vertex movement amount $\eta_i$ at time t will be hereinafter denoted as $\eta^t_i$. In this embodiment, the partial deforming unit 41 calculates a provisional vertex movement amount $\eta'^t_i$, using Expression 4 below, and then modifies into a vertex movement amount $\eta^t_i$ that makes a minimum evaluation value $E^t_D(\eta_i)$ calculated by Expression 3.

$$\eta^t_i = \frac{\omega_{t-1} \cdot \eta^{t-1}_j + \omega'_t \|v^t_i - p^t_i\|_2}{\omega_{t-1} + \omega'_t} \qquad \text{[Expression 4]}$$

Expression 4 is an expression for obtaining a weighted average of the deviation between the vertex $v^t_i$ and the point $p^t_i$ at the current time t and a previous vertex movement amount (for Expression 4, the vertex movement amount for the immediately preceding frame). The terms $\omega_{t-1}$ and $\omega't$ in Expression 4 are coefficients for a weighted average. Note that the depth information I at time t may contain a noise, and the vertex movement amount $\eta_i$ can abruptly change only when a noise is contained, leading to a 3D model $M_D$ having a sharp projection or dent. In view of the above, the provisional vertex movement amount $\eta'^t_i$ is calculated, as by Expression 4, to obtain the average of the vertex movement amounts $\eta_i$ involving a previous vertex movement amount $\eta_i$ in order to prevent the vertex movement amount $\eta_i$ from becoming excessively large or small only at a certain time to thereby prevent such an abrupt change in the vertex movement amount $\eta^t_i$.

The partial deforming unit 41 calculates a provisional vertex movement amount $\eta_i$ for every vertex by Expression 4. The partial deforming unit 41 then obtains a plurality of candidates, based on the calculated provisional vertex movement amounts $\eta_i$. A value that is different from the calculated provisional vertex movement amount $\eta_i$ by an amount within a predetermined range can make a candidate. Any number of candidates can be obtained. The partial deforming unit 41 calculates an evaluation value $E^t_D(\eta_i)$, based on the candidates obtained for every vertex $v_i$, and determines a candidate that makes a minimum evaluation value $E^t_D(\eta_i)$ as the vertex movement amount $\eta_i$.

As described above, in this embodiment, as indicated by the second term on the right side of Expression 3, the partial deforming unit 41 determines the vertex movement amount $\eta_i$ of each vertex, based on the vertex movement amount $\eta_i$ of a neighboring vertex of the vertex. That is, the partial deforming unit 41 deforms each part of the 3D model $M_S$, based on the extent of deforming of the neighboring part of the part. For example, the partial deforming unit 41 can make the difference in extent of deforming between each part of the 3D model $M_S$ and its neighboring part to be less than a predetermined amount.

As known from Expression 4, as the vertex movement amount $\eta_i$ is obtained through weighted average involving a previous vertex movement amount, the partial deforming unit 41 obtains a vertex movement amount $\eta_i$, based on the vertex movement amount $\eta_i$ obtained in the past. That is, the partial deforming unit 41 deforms each part of the 3D model, based on the previous shape of the part. For example, the partial deforming unit 41 can make the difference between the extent of deforming of each part of the 3D model and the extent of previous deforming of the part to be less than a predetermined amount.

Based on the vertex movement amount $\eta_i$ obtained as described above for every vertex, the partial deforming unit 41 changes the position of the vertex. Specifically, the deforming unit 41 moves each vertex to the position determined based on the vertex movement amount $\eta_i$. As the vertex movement amount $\eta_i$ indicates a movement amount in the normal direction here, the partial deforming unit 41 changes the 3D coordinates of the vertex $v_i$ such that the vertex $v_i$ is positioned at a position $v_i'$ displaced by the vertex movement amount $\eta_i$ in the direction of the normal $n_i$. That is, the partial deforming unit 41 deforms the 3D model $M_S$, based on the vertex movement amount $\eta_i$, to thereby generate a 3D model $M_D$.

Figure 15:
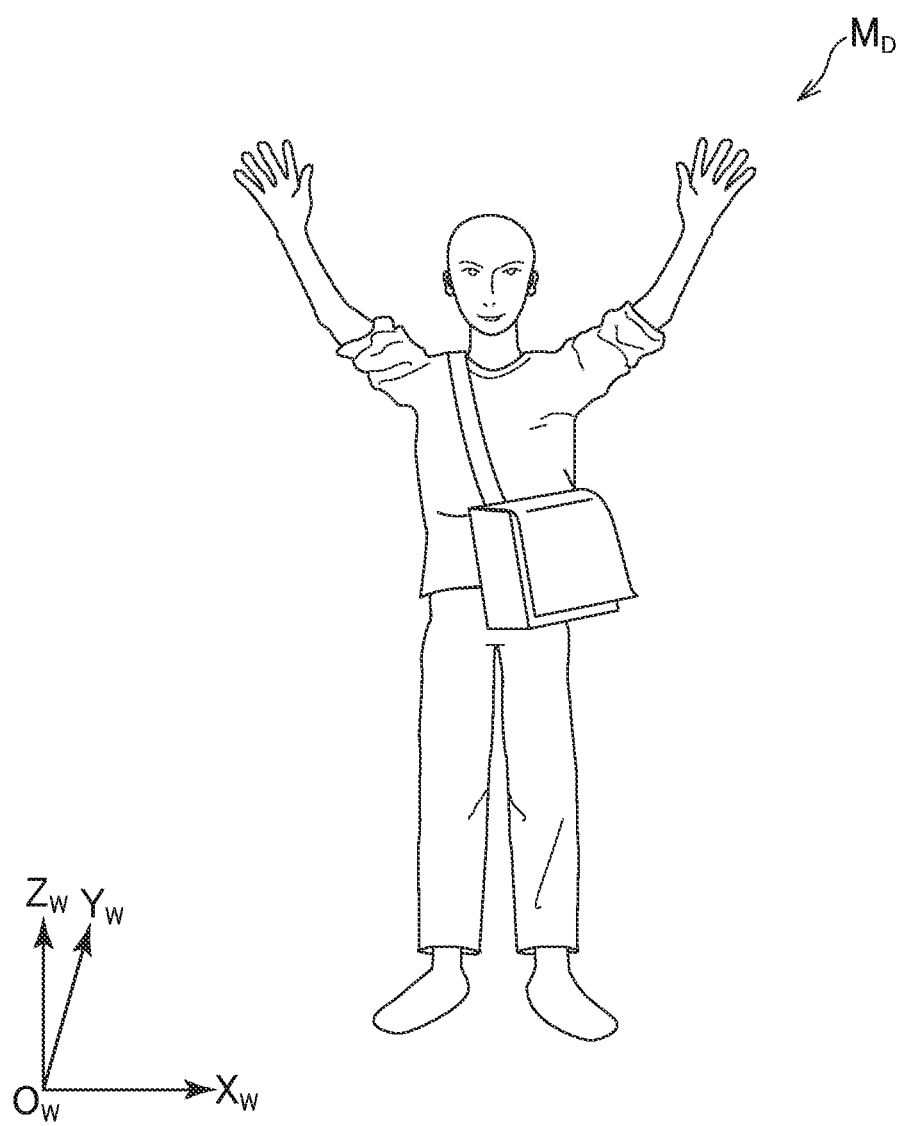
FIG. 15 illustrates a 3D model.

FIG. 15 illustrates the 3D model $M_D$. As illustrated in FIG. 15, detailed shapes, such as clothes wrinkle and a bag, are reproduced on the 3D model $M_D$. The partial deforming unit 41 may map an RGB image photographed by the depth detecting device 10 as a texture on the surface of the 3D model $M_D$. This enables expression with the 3D model $M_D$, of a pattern or a color on the surface of the object.

As a part outside the detection range for the depth detecting device 10 is not detected for a depth, the partial deforming unit 41 may change the shape of a part of the 3D model $M_S$, the part specified by the detection range specifying unit 35. Further, as the vertex movement amount $\eta_i$ is repetitively obtained, the partial deforming unit 41 will change the position of each vertex of the 3D model $M_S$ every time when the vertex movement amount is obtained.

[3-13. Body Portion Identifying Unit]

The body portion identifying unit 42 is implemented using mainly the control unit 21. The body portion identifying unit 42 identifies the body portion of the 3D models $M_S$, MD, based on the surface shapes of the 3D models $M_S$, $M_D$ or the object, the body portion corresponding to the body of the object. Identification of the body portion is made in order to determine the weighting coefficient $\mu^t_i$ of Expression 1. That is, the body portion is a relatively hard portion whose shape changes less, while other portions are relatively soft portions whose shapes change largely. For example, a body portion is a portion with a skin uncovered, while other portions are portions with wrinkle of clothes or a bag (that is, a portion that moves as the body moves).

The shape of clothes wrinkle or a bag is readily changeable, while a body does not abruptly inflate or shrink. In view of the above, a case in which a portion of the 3D model $M_D$, whose position changes largely is identified for identification of a body portion will be described below as an example. In this embodiment, the body portion identifying unit 42 identifies the body portion, based on the positional relationship between vertexes of the 3D model $M_D$ and change in the positional relationship as time passes. For example, the body portion identifying unit 42 may identify the body portion, based on the deviation in position between a vertex and its neighboring vertex at a certain time t or based on the concentration or the extent of scattering of vertexes. Alternatively, for example, the body portion identifying unit 42 may identify the body portion, based on change in position of a vertex as time passes.

In this embodiment, a case in which the curvature of the surface of the 3D model $M_D$ is utilized will be described. The body portion identifying unit 42 obtains an evaluation value κ on the curvature for every vertex of the 3D model, as by Expression 5, in which the evaluation value κ indicates a local curvature and has a value equal to or greater than 1 and equal to or less than −1. In the case where the standard deviation $κ^t$ of the evaluation value κ of a vertex $v_i$ at time t is less than a threshold, which means a small change, the body portion identifying unit 42 determines that the vertex $v_i$ is inside the body portion. Meanwhile, in the case where the standard deviation $κ^t$ is equal to or larger than the threshold, which means a large change, the body portion identifying unit 42 determines that the vertex $v_i$ is outside the area corresponding to the body portion.

$$\kappa = \frac{2}{\pi} \arctan \frac{H}{\sqrt{H^2 - K}} \qquad \text{[Expression 5]}$$

In Expression 5, K indicates a gauss curvature and H indicates a mean curvature. K and H are calculated for every vertex, based on the positional relationship between the vertex and its neighboring vertex, for example, the concentration of vertexes. Methods for calculating the gauss curvature K and the mean curvature H are generally known, with "M. Meyer, M. Desbrun, P. Schroder, and A. H. Barr. Discrete differential-geometry operators for triangulated 2-manifolds. Mathematics and Visualization, pages 35-57, 2003" to be referred to for the details of the method.

In the case where the standard deviation $κ^t$ is equal to or greater than a threshold, the body portion identifying unit 42 sets the weighting coefficient $\mu^t_i$ to a predetermined value $\lambda_u$ less than 1 (for example, $\lambda_u \ll 1$). Meanwhile, in the case where the standard deviation $κ^t$ is less than a threshold, the body portion identifying unit 42 sets the weighting coefficient $\mu^t_i$ to 1. A large standard deviation $κ^t$ means a larger change in curvature. That is, the relevant portion is assumed to be a readily deformable soft object. Meanwhile, a small standard deviation $\kappa^t$ means a small change in curvature. That is, the relevant portion is assumed to be a hardly deformable rigid object. In view of the above, a smaller weighting coefficient $\mu^t_i$ is set to a position with a large standard deviation $\kappa^t$, while a larger weighting coefficient $\mu^t_i$ is set to a position with a small standard deviation $\kappa^t$. Although a case in which the evaluation value $\kappa$ is used is described in the above, an evaluation value c indicating the magnitude of a curvature obtained by Expression 6 below may be utilized to identify the body portion.

[Expression 6]

$$c=\sqrt{2H^2-K}$$

4. Processing Executed in this Embodiment

Figure 16:
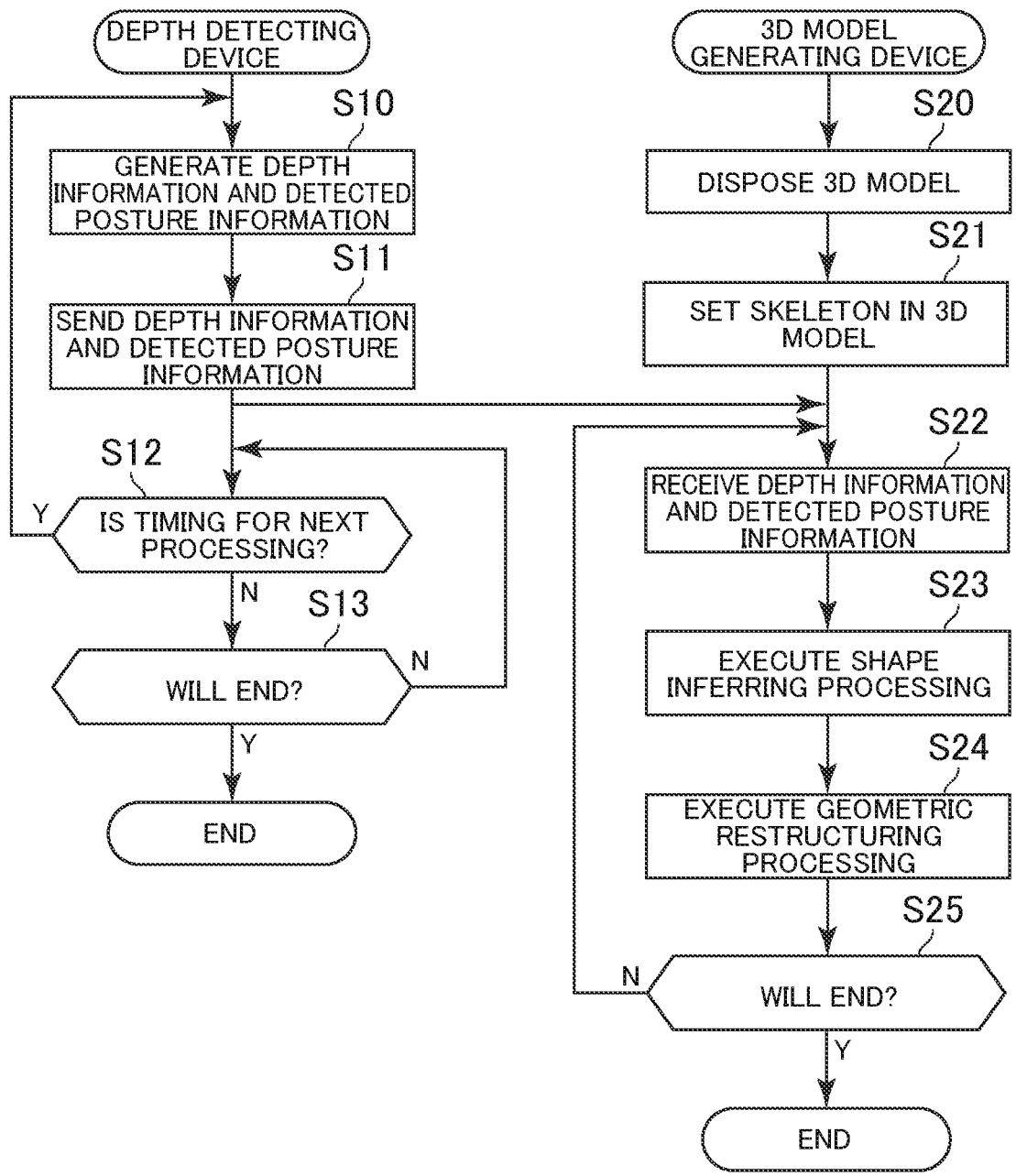
FIG. 16 is a flowchart of one example of the processing executed in a 3D model generating system.

FIG. 16 is a flowchart of one example of the processing executed in the 3D model generating system. The processing illustrated in FIG. 16 is executed by the control units 11, 21 by operating according to the respective programs stored in the storage units 12, 22. The following describes one example of the processing executed by the function blocks illustrated in FIG. 6.

Initially, the operation of the depth detecting device 10 will be described. As illustrated in FIG. 16, the control unit 11 generates the depth information I and the detected posture information J, based on a detection signal from the depth detecting unit 14 (S10). The control unit 11 then sends the depth information I and the detected posture information J generated at S10 to the 3D model generating device 20 (S11).

The control unit 11 determines whether timing for next processing (a frame) has come (S12). A frame rate is assumed to be stored in advance in the storage unit 12. The control unit 11 executes time measuring processing using a real time clock to determine whether the current time corresponds to the time at the beginning of each frame.

When it is not determined that the timing for next processing has come (S12; N), the control unit 11 determines whether to end the ongoing processing (S13). At S13, the control unit 11 determines whether a predetermined end condition is fulfilled (for example, whether a signal for ending the processing has been received from the 3D model generating device 20). When it is not determined to end the ongoing processing (S13; N), the operation flow returns to the processing at S12. Meanwhile, when it is determined to end the ongoing processing (S13; Y), the processing ends.

Meanwhile, when it is determined at S12 that timing for next processing has come (S12; Y), the operation flow returns to the processing at S10. Thereafter, the depth detecting device 10 regularly generates the depth information I and the detected posture information J and send to the 3D model generating device 20 until the end of the ongoing processing.

The following describes the operation of the 3D model generating device 20. As illustrated in FIG. 16, the control unit 21 disposes a 3D model $M_T$ inside a virtual 3D space, based on the template data stored in the storage unit 22 (S20). At S20, the control unit 21 includes a body shape parameter $\{\beta_k\}$ (that is, the initial value) corresponding to the 3D model $M_T$ in the body shape history data. The initial value is stored in advance in the storage unit 22.

The control unit 21 sets a skeleton $J_T$ inside the 3D model $M_T$ disposed at S20, based on the basic posture data stored in the storage unit 22 (S21). At S21, as the 3D model generating device 20 has yet received the depth information I and the detected posture information J from the depth detecting device 10, the 3D model $M_T$ in the 3D space has the basic shape and the basic posture. That is, the body shape and posture of the 3D model $M_T$ do not resemble those of the real object.

The control unit 21 receives the depth information I and the detected posture information J from the depth detecting device 10 (S22). At S22, the control unit 21 includes the received depth information I and detected posture information J in the depth history data and the skeleton history data, respectively. Thereafter, the control unit 21 executes shape inferring processing to infer the shape of the body of the object (S23).

Figure 17:
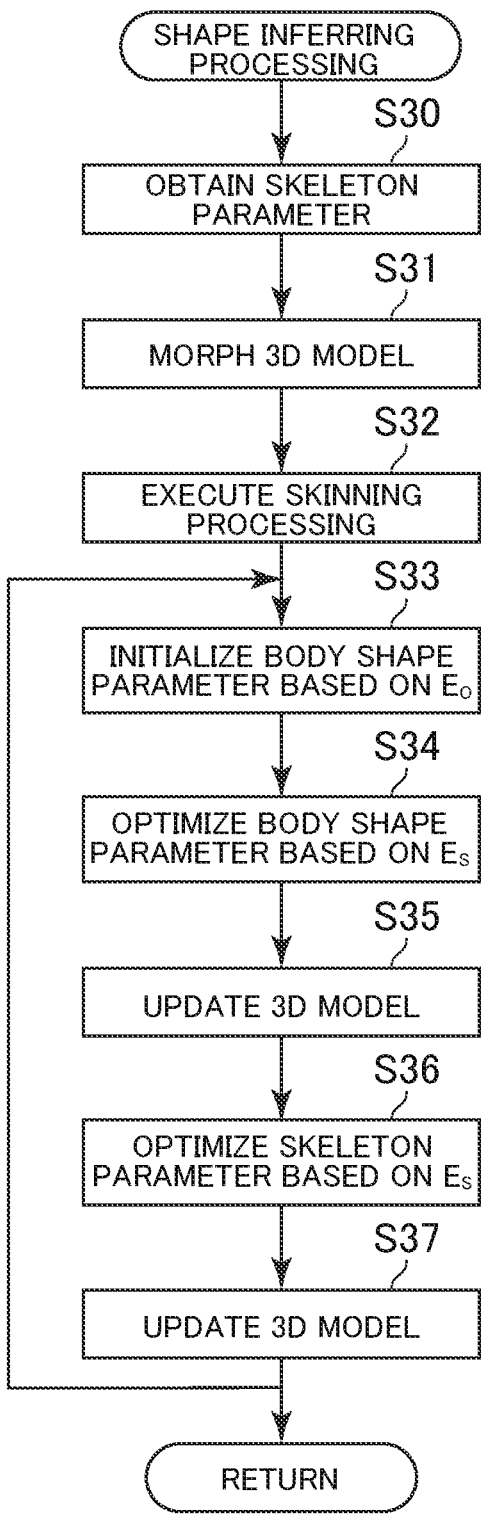
FIG. 17 illustrates details of shape inferring processing.

FIG. 17 illustrates the details of the shape inferring processing. As illustrated in FIG. 17, the control unit 21 obtains the skeleton parameter $\{\theta_j\}$ of the respective joints, based on the detected posture information J received at S22 (S30). Based on the skeleton parameter $\{\theta_j\}$ obtained at S30, the control unit 21 deforms the 3D model $M_T$ (S31). At S31, the control unit 21 deforms the skeleton $J_T$ inside the 3D model $M_T$, based on the skeleton parameter $\{\theta_j\}$ obtained at S31.

The control unit 21 executes skinning processing relative to the 3D model $M_T$ deformed at S31 (S32). The processing at S32 smoothens the surface of the 3D model. With the above, the 3D model $M_S$ is generated. Information (the position of a vertex or the skeleton $J_T$) for identifying a 3D model $M_S$ at time t is included in the body history data.

The control unit 21 initializes the body shape parameter $\{\beta_k\}$, based on the evaluation value $E_O$ (S33). At S33, the control unit 21 substitutes the history included in the body shape history data stored in the storage unit 22 into Expression 2 to determine a value (that is, the average value) that makes a minimum evaluation value $E_O$ as the latest body shape parameter $\{\beta_k\}$. For time t=0, as the initial value alone is included in the body shape history data, the initial value is used.

The control unit 21 optimizes the body shape parameter $\{\beta_k\}$, based on the evaluation value $E_S$ (S34). At S34, the control unit 21 obtains the 3D coordinates of the object, based on the depth information received at S22. Thereafter, the control unit 21 obtains a plurality of candidates for the body shape parameter $\{\beta_k\}$, based on the body shape parameter $\{\beta_k\}$ obtained at S33 and the particle swarm optimization algorithm. The control unit 21 obtains the evaluation value $E_S$ of each candidate, based on the 3D model $M_S$ corresponding to the candidate and Expression 1. The control unit 21 determines a candidate value that makes a minimum evaluation value $E_S$ as the body shape parameter $\{\beta_k\}$ for optimization. The optimized body shape parameter $\{\beta_k\}$ is included in the body shape history data. The control unit 21 updates the 3D model $M_S$, based on the body shape parameter $\{\beta_k\}$ optimized at S34 (S35).

The control unit 21 optimizes the skeleton parameter $\{\theta_j\}$, based on the evaluation value $E_S$ (S36). At S36, the control unit 21 obtains a plurality of candidates for the skeleton parameter $\{\theta_j\}$, based on the latest skeleton parameter $\{\theta_j\}$ and the least squares. The control unit 21 obtains the evaluation value $E_S$ of each candidate, based on a 3D model $M_S$ corresponding to the candidate and Expression 1. The control unit 21 updates the skeleton parameter $\{\theta_j\}$ so as to be equal to the candidate value that makes a minimum evaluation value $E_S$ for optimization. The optimized skeleton parameter $\{\theta_j\}$ is included in the skeleton history data. The control unit 21 updates the 3D model, based on the skeleton parameter $\{\theta_j\}$ optimized at S36.

Thereafter, the control unit 21 repeats the processing at S33 to S37 until the evaluation value $E_S$ becomes sufficiently small. Note that in the case where the depth information I and the detected posture information J are received at S22 (that is, when the next frame has come), as it is necessary to adjust the body shape and posture so as to be in agreement with the latest depth information I and detected posture information J, the processing at S30 and thereafter will be executed again.

Returning to FIG. 16, the control unit 21 executes the geometric restructuring processing to reproduce partial details of the object (S24). The geometric restructuring processing may be executed repetitively or only once within a frame.

Figure 18:
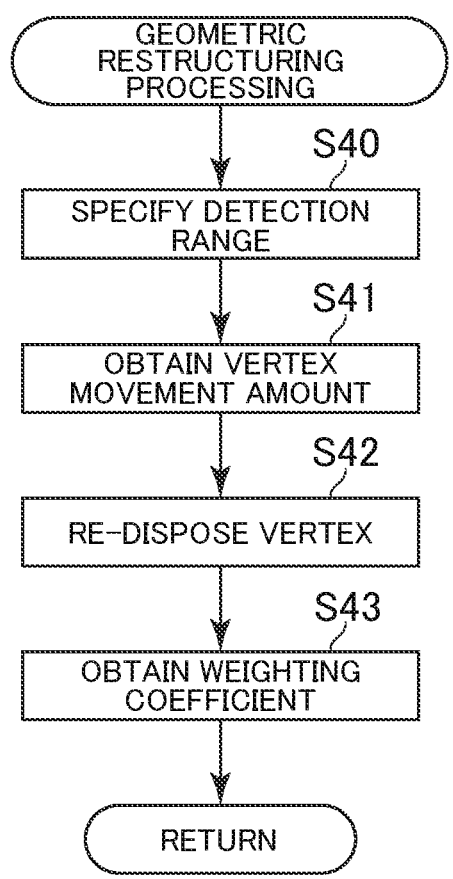
FIG. 18 illustrates details of geometric restructuring processing.

FIG. 18 illustrates the details of the geometric restructuring processing. As illustrated in FIG. 18, the control unit 21 specifies a detection range on the 3D model $M_S$, based on the depth information I obtained at S22 (S40). At S40, the control unit 21 obtains the sight line direction V of the depth detecting device 10, based on the depth information I, and specifies a detection range, based on the relationship relative to the normal $n_i$ of each vertex $v_i$ on the 3D model $M_S$.

The control unit 21 obtains the vertex movement amount $\{\eta_i\}$ for every vertex in the detection range, based on the evaluation value $E_D$ (S41). At S41, the control unit 21 obtains the evaluation value $E_D$, based on the 3D coordinates of a vertex inside the detection range, the 3D coordinates of the object, and Expression 3. The control unit 21 obtains a provisional vertex movement amount $\{\eta_i\}$, based on Expression 4, and modifies the provisional vertex movement amount $\{\eta_i\}$ into a vertex movement amount $\{\eta_i\}$ that makes a minimum evaluation value $E_D$. The vertex movement amount $\{\eta_i\}$ at time t is included in the movement amount history data.

The control unit 21 re-disposes the vertex inside the detection range, based on the vertex movement amount $\{\eta_i\}$ obtained at S41 (S42). With the above, a 3D model $M_D$ is generated. Information for identifying a 3D model $M_D$ at time t (the position of a vertex or the skeleton $J_T$) is included in the restructuring history data.

The control unit 21 obtains a weighting coefficient $\mu_i$ for the vertex inside the detection range, based on the vertex movement amount $\{\eta_i\}$ obtained at S41 (S43). At S43, the control unit 21 distinguishes the body portion of the 3D models $M_S$, MD from other portions, based on Expression 5, and obtains a weighting coefficient $\mu_i$ for every vertex, based on the result of distinction. The weighting coefficient $\mu_i$ obtained at S43 will be used in calculation of the evaluation value $E_D$ in the shape inferring processing at S23.

Returning to FIG. 16, the control unit 21 determines whether to end the ongoing processing (S25). When it is not determined to end the processing (S25; N), the operation flow returns to the processing at S22. When the depth information I and the detected posture information J for the next frame is received, the shape inferring processing and the geometric restructuring processing are executed based on the latest depth information I and detected posture information J. Meanwhile, when it is determined to end the processing (S25; Y), this processing ends.

According to the above described 3D model generating system 1, as the posture of the 3D model $M_T$ is made similar to that of the object before determining the body shape parameter $\{\beta_k\}$ in generation of a 3D model $M_S$, it is possible to quickly generate a highly precise 3D model $M_S$. That is, as analysis of many images from the depth detecting device 10 is unnecessary, it is unnecessary to execute complicated processing, and thus it is possible to quickly generate a 3D model $M_S$. Additionally, as the body shape parameter $\{\beta_k\}$ is optimized such that the body line of the 3D model $M_T$ is similar to the real body line of the object, it is possible to enhance the precision of the 3D model $M_S$. Enhanced precision of the 3D model $M_S$ enables, for example, pseudo try-on of a product in an on-line shopping mall or the like by superimposing the product, such as clothes, on the 3D model $M_S$. Moreover, usage of the 3D model $M_S$ can be diverged so as to include, for example, production of tailor-made clothes.

As the skeleton parameter $\{\theta_j\}$ is optimized so that the deviation of the 3D model $M_S$ from the real skeleton of the object becomes smaller, it is possible to make the posture of the 3D model $M_S$ similar to that of the object. This can further enhance the precision of the 3D model $M_S$. For example, although complete matching between the detected posture information J and the skeleton $J_T$ is difficult to achieve, as described above, optimization of the skeleton parameter $\{\theta_j\}$ can make both the body shape and the posture similar to those of the real object. Further, repetitive execution of optimization of the body shape parameter $\{>_k\}$ and subsequent optimization of the skeleton parameter $\{\theta_j\}$ enables gradual reduction of the deviation between the 3D model $M_S$ and the object.

Partial deforming of the 3D model $M_S$, based on the vertex movement amount $\eta_i$, can make the shape of each part of the 3D model $M_D$ similar to a corresponding partial shape of the object. This can enhance the precision of the 3D model $M_D$. For example, even when the depth detecting device 10 alone is used, as in this embodiment, details such as clothes wrinkle can be reproduced on the 3D model $M_D$ with respect to a surface detected by the depth detecting device 10, and the body line can be reproduced with respect to other surfaces.

Limiting a target of the geometric restructuring processing to an area inside the detection area eliminates execution of the processing to a part not in need of deforming. This can reduce the processing load of the 3D model generating device 20, and enables quicker generation of the 3D model $M_D$.

As the vertex movement amount $\eta_i$ of each vertex is determined based on the vertex movement amount of its neighboring vertex, it is possible to morph the shape of each part of the 3D model $M_S$, based on the shape of its neighboring part. As a result, it is possible to prevent a model from having an unnatural local projection or dent. This can enhance the precision of the 3D model $M_D$.

As the vertex movement mount ηi of each vertex is determined based on its previous vertex movement amount, it is possible to morph each part of the 3D model based on its previous shape. As a result, it is possible to prevent sharp deforming of a specific part that occurs only at a specific time.

As use of the weighting coefficient μi can prevent the influence of a portion other than the body on the evaluation value $E_D$, it is possible to reduce the influence of a portion not important in inferring the body line of the object on the evaluation value $E_D$. As a result, it is possible to infer the body line of the object, using a highly reliable portion, in creation of the 3D model $M_S$. This can further enhance the precision of the 3D model $M_S$.

Deforming the 3D mode $M_S$, based on the extent of deviation inside the detection range for the depth detecting device 10, can prevent the influence of a position outside the detectable range on the body shape of the 3D model $M_S$. This can further enhance the precision of the 3D model $M_S$.

As the body shape parameter is determined based on the history of the body shape parameter $\{\beta_k\}$, it is possible to prevent the body shape parameter $\{\beta_k\}$ from abruptly becoming larger. As a result, it is possible to prevent an unnatural situation in which the body shape of the 3D model $M_S$ abruptly changes only at a specific time.

5. Modified Examples

The present invention is not limited to the above described embodiments and can be desirably modified within a range not departing from the gist of the present invention.

For example, although a case in which the body shape parameter $\{\beta_k\}$ is optimized before the skeleton parameter $\{\theta_j\}$ is optimized has been described, this order for optimization may be reversed. Further, for example, although a case in which the body shape parameter $\{\beta_k\}$ and the skeleton parameter $\{\theta_j\}$ are both optimized has been described, only either one of these may be optimized.

For example, although a case in which the extent of deforming of a neighboring vertex and a change in the extent of deforming as time passes are taken into consideration in calculation of the vertex movement amount $\eta_i$ has been described in the above, these may not be taken into consideration when the processing speed is prioritized. Similarly, although a case in which the evaluation vale $E_O$ is used to prevent a significant departure from a previous body shape parameter $\{\beta_j\}$ has been described in the above, a previous body shape parameter $\{\beta_j\}$ may not be taken into consideration when the processing speed is prioritized. Although a case in which an area inside the detection range on the 3D model $M_S$ is specified in obtaining the evaluation value $E_S$ or to be used as a target of the geometric restructuring processing has been described in the above, the entire surface of the 3D model $M_S$ may be used as a processing target, with a detection range not considered.

For example, although a case in which the shape inferring processing and the geometric restructuring processing are both executed has been described, in the case where the 3D model generating system 1 is used only to infer a body line, the geometric restructuring processing is omissible. Further, expressions for calculation of the evaluation values $E_S$, $E_D$, $E_O$ are mere examples, and other expressions may be used for the calculation. For example, the body portion may be identified, using a 3D model $M_S$ or the depth information I. When the 3D model $M_S$ is used, similar to the method described in the embodiment, the body portion can be identified based on the positional relationship between vertexes or change in the positional relationship as time passes. Meanwhile, when the depth information I is used, only a vertex closest to each point on the surface $S_{OB}$ of the object may be considered as belonging to the body portion, while the others may be considered outside the body portion.

For example, the 3D model generating device 20 may generate the detected posture information J. In this case, the 3D model generating device 20 generates the detected posture information J, based on the depth information I. Further, for example, the depth detecting device 10 may generate the skeleton parameter $\{\theta_j\}$ and send to the 3D model generating device 20. Still further, for example, a frame rate may not be determined so that the depth detecting device 10 irregularly generates the depth information I and the detected posture information J. Yet further, for example, the object may be animals (for example, dogs or cats) other than human being.

For example, although a case in which the respective functions are implemented in the 3D model generating device 20 has been described in the above, the respective functions may be implemented in the depth detecting device 10 and/or other computers. For example, the respective functions may be implemented by a plurality of computers in the 3D model generating system 1. Further, of the above described functions, the functions other than the skeleton obtaining unit 32, the posture changing unit 34, the surface shape obtaining unit 36, the body shape determining unit 37, and the body shape deforming unit 39 are omissible.

The invention claimed is:

1. A three-dimensional model generating system, comprising at least one processor configured to:
    obtain a skeleton parameter, based on depth information of an object detected by a depth detecting device, which includes a depth sensor;
    change a posture of a three-dimensional model that is able to be deformed based on a body shape parameter, based on the skeleton parameter;
    obtain a surface shape of the object, based on the depth information;
    determine the body shape parameter, based on a difference between a surface shape of the three-dimensional model having the posture changed and the surface shape of the object;
    deform the three-dimensional model, based on the body shape parameter;
    identify a body portion corresponding to a body of the object from among the three-dimensional model, based on the surface shape of the three-dimensional model or the object; and
    make larger a weight for a difference relevant to the body portion than a weight for a difference relevant to other portions when determining the body shape parameter.

2. The three-dimensional model generating system according to claim 1, wherein the at least one processor:
    determines the skeleton parameter, based on a difference between the surface shape of the three-dimensional model and the surface shape of the object, and
    updates the posture of the three-dimensional model, based on the skeleton parameter.

3. The three-dimensional model generating system according to claim 1, wherein the at least one processor deforms a first part of the surface shape of the three-dimensional model, based on a difference in surface shape between the first part and a second part of the object corresponding to the first part.

4. The three-dimensional model generating system according to claim 2, wherein the at least one processor deforms a first part of the surface shape of the three-dimensional model, based on a difference in surface shape between the first part and a second part of the object corresponding to the first part.

5. The three-dimensional model generating system according to claim 3, wherein the at least one processor:
    specifies a third part corresponding to a detection range of the depth detecting device from among the three-dimension model, based on the depth information, and
    deforms the third part at the three-dimension model.

6. The three-dimensional model generating system according to claim 4, wherein the at least one processor:
    specifies a third part corresponding to a detection range of the depth detecting device from among the three-dimension model, based on the depth information, and
    deforms the third part at the three-dimension model.

7. The three-dimensional model generating system according to claim 3, wherein the at least one processor deforms each part of the three-dimensional model, based on a deforming extent of a neighboring part of the three-dimensional model.

8. The three-dimensional model generating system according to claim 4, wherein the at least one processor deforms each part of the three-dimensional model, based on a deforming extent of a neighboring part of the three-dimensional model.

9. The three-dimensional model generating system according to claim 5, wherein the at least one processor deforms each part of the three-dimensional model, based on a deforming extent of a neighboring part of the three-dimensional model.

10. The three-dimensional model generating system according to claim 6, wherein the at least one processor deforms each part of the three-dimensional model, based on a deforming extent of a neighboring part of the three-dimensional model.

11. The three-dimensional model generating system according to claim 3, wherein the at least one processor deforms each part of the three-dimensional model, based on a previous shape of the part.

12. The three-dimensional model generating system according to claim 4, wherein the at least one processor deforms each part of the three-dimensional model, based on a previous shape of the part.

13. A three-dimensional model generating system comprising at least one processor configured to:
    obtain a skeleton parameter, based on depth information of an object detected by a depth detecting device, which includes a depth sensor;
    change a posture of a three-dimensional model that is able to be deformed based on a body shape parameter, based on the skeleton parameter;
    obtain a surface shape of the object, based on the depth information;
    determine the body shape parameter, based on a difference between a surface shape of the three-dimensional model having the posture changed and the surface shape of the object;
    deform the three-dimensional model, based on the body shape parameter;
    specify a vertex corresponding to a detection range of the depth detecting device from the three-dimensional model, based on the depth information; and
    determine the body shape parameter, based on a difference between the surface shape of the three-dimensional model in the detection range and the surface shape of the object in the detection range.

14. The three-dimensional model generating system according to claim 1, wherein the at least one processor:
    records a history of the body shape parameter in a storage, and
    determines the body shape parameter, based on the history.

15. The three-dimensional model generating system according to claim 8, wherein the at least one processor:
    records a history of the body shape parameter in a storage, and
    determines the body shape parameter, based on the history.

16. A non-transitory computer-readable information storage medium having stored thereon a program for causing a computer to:
    obtain a skeleton parameter, based on depth information of an object detected by a depth detecting device, which includes a depth sensor;
    change a posture of a three-dimensional model that is able to be morphed based on a body shape parameter, based on the skeleton parameter;
    obtain a surface shape of the object, based on the depth information;
    determine the body shape parameter, based on a difference between a surface shape of the three-dimensional model having the posture changed and the surface shape of the object;
    deform the three-dimensional model, based on the body shape parameter;
    identify a body portion corresponding to a body of the object from among the three-dimensional model, based on the surface shape of the three-dimensional model or the object; and
    make larger a weight for a difference relevant to the body portion than a weight for a difference relevant to other portions when determining the body shape parameter.

17. A non-transitory computer-readable information storage medium having stored thereon a program for causing a computer to:
    obtain a skeleton parameter, based on depth information of an object detected by a depth detecting device, which includes a depth sensor;
    change a posture of a three-dimensional model that is able to be morphed based on a body shape parameter, based on the skeleton parameter;
    obtain a surface shape of the object, based on the depth information;
    determine the body shape parameter, based on a difference between a surface shape of the three-dimensional model having the posture changed and the surface shape of the object;
    deform the three-dimensional model, based on the body shape parameter;
    specify a vertex corresponding to a detection range of the depth detecting device from the three-dimensional model, based on the depth information; and
    determine the body shape parameter, based on a difference between the surface shape of the three-dimensional model in the detection range and the surface shape of the object in the detection range.

* * * * *